US012587248B2

(12) United States Patent
Gao et al.

(10) Patent No.: US 12,587,248 B2
(45) Date of Patent: Mar. 24, 2026

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 18/270,128

(22) PCT Filed: Jan. 11, 2021

(86) PCT No.: PCT/CN2021/071147
§ 371 (c)(1),
(2) Date: Jun. 28, 2023

(87) PCT Pub. No.: WO2022/147845
PCT Pub. Date: Jul. 14, 2022

(65) Prior Publication Data
US 2024/0063870 A1 Feb. 22, 2024

(51) Int. Cl.
*H04B 7/06* (2006.01)

(52) U.S. Cl.
CPC ........... *H04B 7/0626* (2013.01); *H04B 7/063* (2013.01)

(58) Field of Classification Search
CPC .............................................. H04B 7/06–0695
See application file for complete search history.

(56) References Cited

U.S. PATENT DOCUMENTS

2015/0215018 A1 7/2015 Xiong et al.
2015/0351085 A1 12/2015 Lee et al.

2018/0279288 A1 9/2018 Lee et al.
2019/0068267 A1 2/2019 Rahman et al.
2019/0260448 A1 8/2019 Rahman et al.
2020/0099432 A1 3/2020 Määttanen et al.
2020/0145979 A1 5/2020 Lee et al.
2020/0220591 A1 7/2020 Zhang et al.
(Continued)

FOREIGN PATENT DOCUMENTS

CN 103580820 A 2/2014
CN 110831196 A 2/2020
(Continued)

OTHER PUBLICATIONS

JP Office Action for JP Application No. 2023-541764, mailed on Jul. 30, 2024 with English Translation.
Qualcomm Incorporated, "CSI enhancements: MTRP and FR1 FDD reciprocity", 3GPP TSG RAN WG1 #102-e R1-2006796, Aug. 8, 2020, pp. 1-pp. 11.
(Continued)

*Primary Examiner* — Michael Thier
*Assistant Examiner* — Prince A Mensah
(74) *Attorney, Agent, or Firm* — Sughrue Mion, PLLC

(57) ABSTRACT

Embodiments of the present disclosure provide a solution for CSI reporting. In a method for communication, a terminal device receives one or more configurations for at least one of a first Channel State Information (CSI), a second CSI or a third CSI in a CSI reporting setting. The one or more configurations in the CSI reporting setting include at least one of at least two rank restrictions or at least two codebook subset restrictions (CBSRs). The terminal device transmits, to a network device, at least one of the first CSI, the second CSI or the third CSI based on the one or more configurations.

22 Claims, 8 Drawing Sheets

CSI A: ONE CRI (CRI_1), ONE PMI (PMI_1), ONE RI (RI_1)

CSI B: ONE CRI (CRI_2), ONE PMI (PMI_2), ONE RI (RI_2)

CSI C: ONE CRI (CRI_3'), TWO PMIS (PMI_3, PMI_4), TWO RIS (RI_3, RI_4)

(56) References Cited

U.S. PATENT DOCUMENTS

| | | | |
|---|---|---|---|
| 2020/0412431 A1 | 12/2020 | Park et al. | |
| 2021/0143870 A1 | 5/2021 | Faxér et al. | |
| 2021/0167830 A1 | 6/2021 | Song et al. | |
| 2021/0281306 A1 | 9/2021 | Rahman et al. | |
| 2022/0166469 A1 | 5/2022 | Faxer et al. | |
| 2022/0345197 A1* | 10/2022 | Farag | H04W 72/21 |
| 2022/0376760 A1 | 11/2022 | Rahman et al. | |
| 2023/0087003 A1* | 3/2023 | Hao | H04B 7/0632 |
| | | | 370/329 |
| 2024/0291539 A1 | 8/2024 | Song et al. | |

FOREIGN PATENT DOCUMENTS

| | | |
|---|---|---|
| CN | 110945793 A | 3/2020 |
| CN | 111771341 A | 10/2020 |
| JP | 2019-186673 A | 10/2019 |
| WO | 2014/109589 A1 | 7/2014 |
| WO | 2017/030490 A2 | 2/2017 |
| WO | 2018/208216 A1 | 11/2018 |
| WO | 2018/226581 A1 | 12/2018 |
| WO | 2019/237339 A1 | 12/2019 |

OTHER PUBLICATIONS

Extended European Search Report for EP Application No. 21916898.6, dated on Feb. 7, 2024.

"Further discussion and evaluation on MTRP CSI and partial reciprocity", 3GPP TSG RAN WG1 #103-e, R1-2009509, Source: VIVO, date: Oct. 26-Nov. 13, 2020, 25 pages.

"Enhancements on CSI reporting for Multi-TRP", 3GPP TSG RAN WG1 #103-e, R1-2008006, Source: CMCC, date: Oct. 26-Nov. 13, 2020, 3 pages.

"Discussion on CSI enhancement for multi-TRP transmission", 3GPP TSG RAN WG1 #103-e, R1-2008949, Source: NEC, date: Oct. 26-Nov. 13, 2020, 2 pages.

International Search Report of PCT/CN2021/071147 dated Oct. 15, 2021 [PCT/ISA/210].

Written Opinion of PCT/CN2021/071147 dated Oct. 15, 2021 [PCT/ISA/237].

IN Office Action for IN Application No. 202317046556, mailed on Apr. 22, 2025.

CN Office Action for CN Application No. 202180090230.X, mailed on Aug. 6, 2025 with English Translation.

Ericsson, "[E040, E060] Correction to AS configuration failure in NR V2X", 3GPP TSG-RAN WG2 Meeting #109bis-e R2-2003207, Apr. 13, 2020.

* cited by examiner

CSI A:  ONE CRI (CRI_1), ONE PMI (PMI_1),  ONE RI (RI_1)

CSI B:  ONE CRI (CRI_2), ONE PMI (PMI_2),  ONE RI (RI_2)

CSI C: TWO CRIS (CRI_3, CRI_4),  TWO PMIS (PMI_3, PMI_4), TWO RIS (RI_3, RI_4)

CSI A: one CRI (CRI_1), one PMI (PMI_1), one RI (RI_1)

CSI B: one CRI (CRI_2), one PMI (PMI_2), one RI (RI_2)

CSI C: one CRI (CRI_3'), two PMIs (PMI_3, PMI_4), two RIs (RI_3, RI_4)

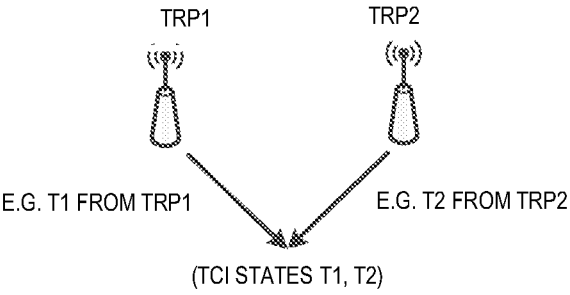
E.G. T1 FROM TRP1          E.G. T2 FROM TRP2
(TCI STATES T1, T2)
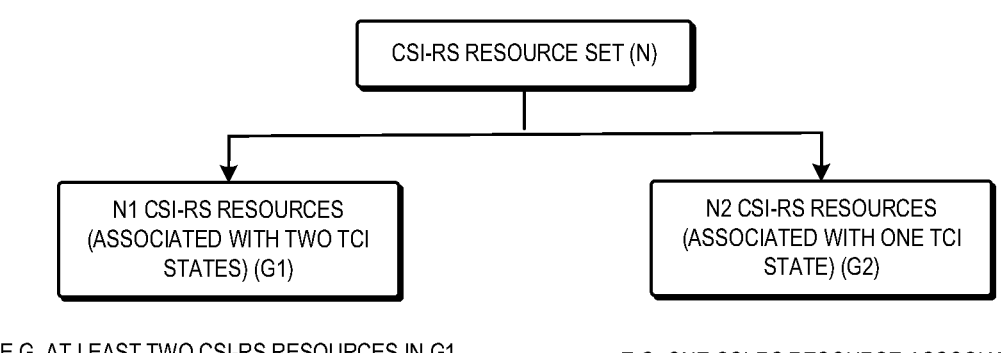
E.G. AT LEAST TWO CSI-RS RESOURCES IN G1
ASSOCIATED WITH SAME TWO TCI STATES;
CSI-RS RESOURCE RE1 (TCI STATES T1, T2),
CSI-RS RESOURCE RE2 (TCI STATES T1, T2)
E.G. ONE CSI-RS RESOURCE ASSOCIATED
EITHER WITH TRP1 OR TRP2
FIG. 7

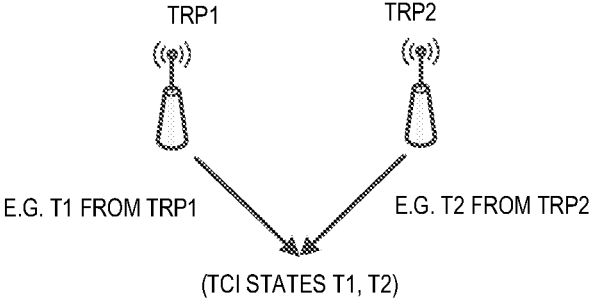
E.G. T1 FROM TRP1        E.G. T2 FROM TRP2
(TCI STATES T1, T2)
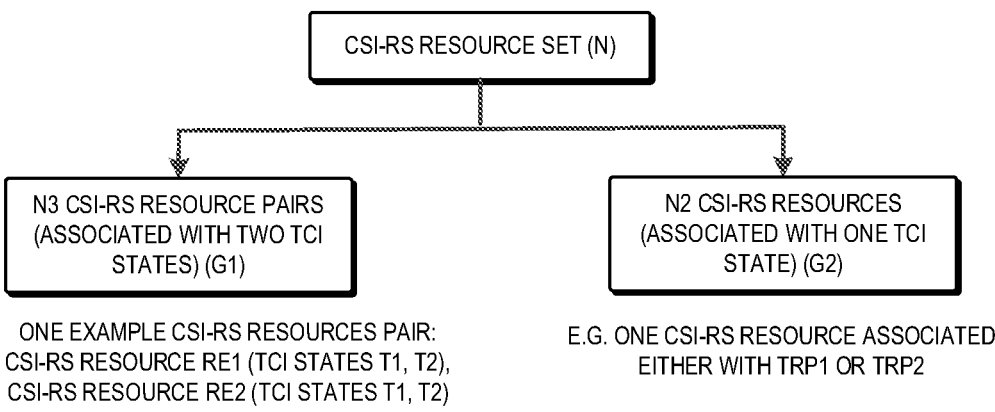
ONE EXAMPLE CSI-RS RESOURCES PAIR:
CSI-RS RESOURCE RE1 (TCI STATES T1, T2),
CSI-RS RESOURCE RE2 (TCI STATES T1, T2)
E.G. ONE CSI-RS RESOURCE ASSOCIATED
EITHER WITH TRP1 OR TRP2
FIG. 8

CSI A:  ONE CRI (CRI_1), ONE PMI (PMI_1),  ONE RI (RI_1)

CSI B:  ONE CRI (CRI_2), ONE PMI (PMI_2),  ONE RI (RI_2)

CSI C: ONE CRI (CRI_3'),  TWO PMIS (PMI_3, PMI_4), TWO RIS (RI_3, RI_4)

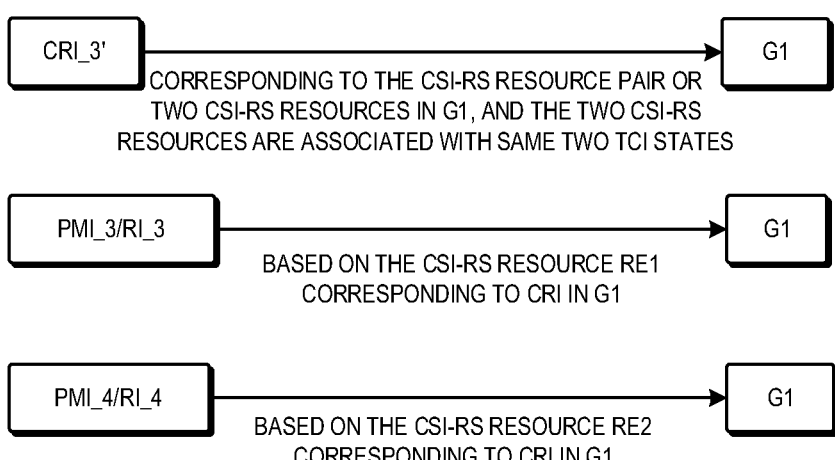

CRI_3' → G1
CORRESPONDING TO THE CSI-RS RESOURCE PAIR OR
TWO CSI-RS RESOURCES IN G1, AND THE TWO CSI-RS
RESOURCES ARE ASSOCIATED WITH SAME TWO TCI STATES

PMI_3/RI_3 → G1
BASED ON THE CSI-RS RESOURCE RE1
CORRESPONDING TO CRI IN G1

PMI_4/RI_4 → G1
BASED ON THE CSI-RS RESOURCE RE2
CORRESPONDING TO CRI IN G1

FIG. 9

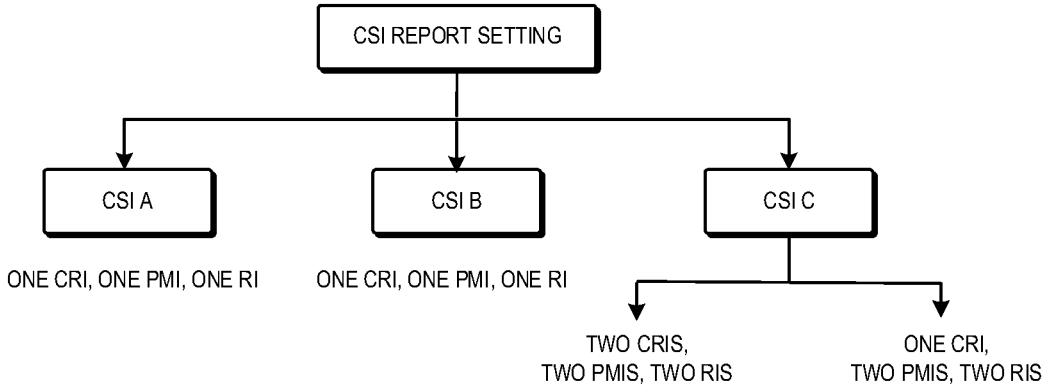

CSI REPORT SETTING

CSI A
ONE CRI, ONE PMI, ONE RI

CSI B
ONE CRI, ONE PMI, ONE RI

CSI C

TWO CRIS,
TWO PMIS, TWO RIS

ONE CRI,
TWO PMIS, TWO RIS

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2021/071147 filed on Jan. 11, 2021.

FIELD

Embodiments of the present disclosure generally relate to the field of communication, and more particularly, to a solution for Channel State Information (CSI) reporting.

BACKGROUND

New Radio (NR) is the global standard for a unified and more capable 5G wireless air interface. 5G enables a new kind of network that is designed to connect virtually everyone and everything together including machines, objects, and devices. Multiple-Input and Multiple-Output (MIMO) technology is a method for multiplying the capacity of a radio link using multiple transmission and receiving antennas to exploit multipath propagation. The MIMO includes features that facilitate utilization of a large number of antenna elements at a Base Station (BS) for sub-6 GHz and over-6 GHz. In the 3rd Generation Partnership Project (3GPP) Release 17 (Rel-17), further enhanced MIMO (FeMIMO) technology is introduced to improve the management of beamforming and beamsteering and reduce associated overheads. In addition, in Rel-17. Work item Description (WID) on FeMIMO in NR was already agreed to enhance CSI measurement and reporting for Multiple Transmission/Reception Points (multi-TRP).

With regard to CSI measurement associated to a CSI reporting setting for non-coherent Joint Transmission (NUT), it was identified that non-zero-power (NZP) Channel State Information Reference Signal (CSI-RS) resources for channel measurement shall be associated to different TRPs/Transmission Configuration Indication (TCI) states at resource level (at least for multi-Downlink Control Indication (DCI) based and single-DC based schemes).

However, there is no suitable solution for CSI reporting, especially regarding the multi-TRP transmission and thus it still cannot benefit therefrom. Therefore, there is a need for improved solution of CSI reporting in NR system.

SUMMARY

In general, embodiments of the present disclosure provide a solution for CSI reporting.

In a first aspect, there is provided a method for communication. The method comprises receiving, at a terminal device, one or more configurations for at least one of a first Channel State Information (CSI), a second CSI or a third CSI in a CSI reporting setting. The one or more configurations in the CSI reporting setting include at least one of at least two rank restrictions or at least two codebook subset restrictions (CBSRs). The method further includes transmitting, to a network device, at least one of the first CSI, the second CSI or the third CSI based on the one or more configurations.

In a second aspect, there is provided a method for communication. The method comprises transmitting, at a network device, one or more configurations for at least one of a first Channel State Information (CSI), a second CSI or a third CSI in a CSI reporting setting. The one or more configurations in the CSI reporting setting include at least one of at least two rank restrictions or at least two codebook subset restrictions (CBSRs). The method further comprises receiving, at a network device, at least one of the first CSL, the second CSI or the third CSI based on the one or more configurations.

In a third aspect, there is provided a terminal device. The terminal device comprises a processor configured to perform the method according to the first aspect.

In a fourth aspect, there is provided a first network device. The network device comprises a processor configured to perform the method according to the second aspect.

In a fifth aspect, there is provided a computer readable medium having instructions stored thereon. The instructions, when executed on at least one processor or a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates a schematic diagram of CSI reporting according to an embodiment of the present disclosure;

FIG. 8 illustrates a schematic diagram of CSI reporting according to an embodiment of the present disclosure;

FIG. 9 illustrates a schematic diagram of CSI reporting according to an embodiment of the present disclosure:

FIG. 10 illustrates a schematic diagram of CSI reporting according to an embodiment of the present disclosure;

Throughout the drawings, the same or similar reference numerals represent the same or similar elements.

DETAILED DESCRIPTION OF EMBODIMENTS

Figure 1:
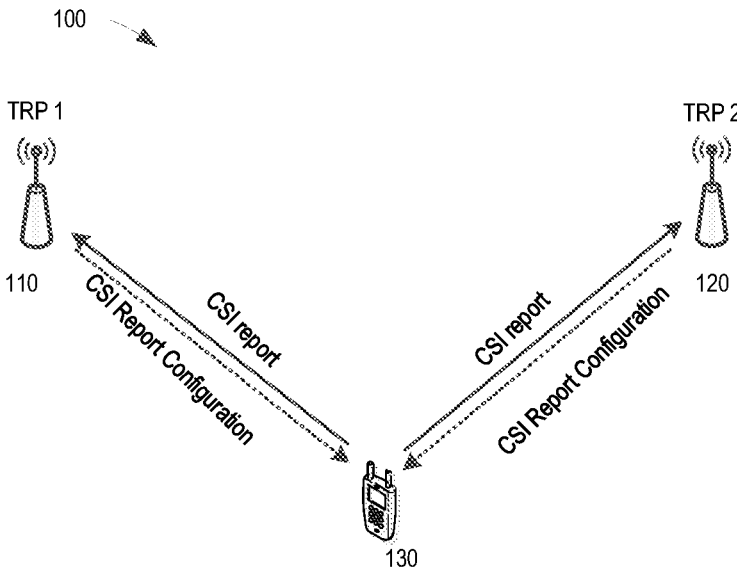
FIG. 1 illustrates a schematic diagram of a communication environment in which some embodiments of the present disclosure can be implemented.

Principles of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (13S) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node, such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices. Internet of Everything (IoE) devices, machine type communication (MTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling. Medium Access Control (MAC) control element (CE) or Downlink Control Information (DCI).

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (memories) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL)

transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a." "an" and "the" are intended to include the plural forms as well, unless the context clearly indicates otherwise. The term "includes" and its variants are to be read as open terms that mean "includes, but is not limited to" The term "based on" is to be read as "based at least in part on." The term "one embodiment" and "an embodiment" are to be read as "at least one embodiment" The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, in 3GPP Rel-17, WID on FeMIMO in NR was already agreed to enhance CSI measurement and reporting for Multiple Transmission Points (multi-TRP). It was already identified that for CSI measurement associated to a CSI reporting setting for NCJT, the NZP CSI-RS resources for channel measurement shall be associated to different TRPs/TCI states at resource level (at least for multi-DCI based and single-DCI based schemes). For a CSI report associated with a Multi-TRP/panel NCJT measurement hypothesis configured by single CSI reporting setting, the UE is expected to report two RIs, two precoding matrix indices (PMIs), two layer indices (Lis) and one CQI per codeword, for single-DCI based NCJT when the maximal transmission layers is less than or equal to 4.

In addition, for CSI reporting, there can be three alternative options of CSI reporting mechanisms. For alternative option 1, the UE can be expected to report one CSI associated with the best single-TRP measurement hypothesis and one CSI associated with the best NCJT measurement hypothesis, if configured. In alternative option 2, the UE can be expected to report one CSI associated with the best one among NCJT and/or single-TRP measurement hypotheses, if configured. Regarding alternative option 3, the CE can be expected to report two CSIs associated with the two best single-TRP measurement hypotheses associated with Channel Measurement Resources (CMRs) from two TRPs and one CSI associated with the best NCJT measurement hypothesis, if configured.

In Radio Access Network RAN1 #103e, it was agree to study, for NCJT CSI measurement configured with single reporting setting, many measurement resource configuration/association mechanism, such as whether/how to support interference measurement based on NZP CSI-RS given by nzp-CSI-RS-ResourcesForInterference or based on CSI-Interference Measurement (IM) given by csi-IM-Resources-ForInterference, whether/how to interpret measurement based on CMRs associated with different TRPs/TCI states respectively for a NCJT measurement hypothesis. CMR/IM resources (IMR) resource configuration restrictions/associations, e.g. for reference resource/time domain behavior/ frequency domain behavior, etc.

In the current NR system. CSI-RS resource indicator (CRI) is used to indicate the selected CSI-RS resource from the multiple CSI-RS resources NZP CSI-RS resource set configured for the CSI reporting. The bitwidth of CRT is determined based on the number of CSI-RS resources in the corresponding resource set and transmission codebook subset and RI can be restricted to reduce computation complexity and signaling overhead. However, the above solutions in the current NR system do not suit for multi-TRP NCJT scenario and there is no appropriate design for of CRS reporting or CSI reporting setting in the existing solution either.

In order to solve the above technical problems and potentially other technical problems in the conventional solutions, embodiments of the present disclosure provide a solution for CSI reporting. In some embodiments, a terminal device receives one or more configurations for at least one of a first CSI, a second CSI or a third CSI in a CSI reporting setting, wherein the one or more configurations in the CSI reporting setting include at least one of at least two rank restrictions or at least two codebook subset restrictions (CBSRs). The terminal device transmits, to a network device, at least one of the first CSI, the second CSI and the third CSI based on the one or more configurations in the CSI reporting.

With embodiments of the present disclosure, one or more additional CSI is further introduced to support the CSI feedback for multi-TRP NCJT scenario or support dynamic transmission, and additionally or alternatively, a new solution for RI restriction and/or CBSR restriction are also proposed to further reduce the computation complexity and system overhead.

Hereinafter, reference will be further made to accompanying drawings to describe the solutions as proposed in the present disclosure in details. However, it shall be appreciated that the following embodiments are given only for illustrative purposes and the present disclosure is not limited thereto. In addition, the solution as provided herein can be used in the NR system or any other communication with similar issues.

FIG. 1 illustrates a schematic diagram of a communication environment 100 in which some embodiments of the present disclosure can be implemented. As illustrated in FIG. 1, the communication environment 100, which may also be referred to as a communication network 100 or a communication system 100, includes a first TRP 110 (TRP 1), a second TRP 120, (TRP 2), and a terminal device 130. In particular, the terminal device 130 may communicate with the first TRP 110 and a second TRP 120 via a communication link. For transmissions from the TRP 110, 120 to the terminal device 120, the communication link may be referred to as a downlink, whereas for transmissions from the terminal device 130 to the TRP 110, 120 the communication link may be referred to as an uplink.

The communication environment 100 may conform to any suitable standards including, but not limited to. Global System for Mobile Communications (GSM), Long Terni Evolution (LTE), LTE-Evolution. LTE-Advanced (LTE-A). Wideband Code Division Multiple Access (WCDMA).

Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the forth generation (4G), 4.5G, the fifth generation (5G) communication protocols.

The network 100 (such as, a gNB) may be equipped with one or more TRPs or antenna panels. As used herein, the term "TRP" refers to an antenna array (with one or more antenna elements) available to the network device located at a specific geographical location. For example, a network device may be coupled with multiple TRPs in different geographical locations to achieve better coverage. The one or more TRPs may be included in a same serving cell or different serving cells.

It is to be understood that the TRP can also be a panel, and the panel can also refer to an antenna array (with one or more antenna elements). Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

In the example scenario as shown in FIG. 1, the environment 100 supports a transmission to the terminal device 130 from a single TRP, for example either from the first TRP 110 or the second TRP 120, and such a transmission may also be called as a single TRP transmission. Additionally, the terminal device 130 can also receive a transmission from multiple network devices at the same time, for example from both the first and second network TRPs 110, 120, and such a transmission may be referred to as a multi-TRP transmission. In some embodiments of the present disclosure, the two TRPs 110, 120 can be contained in the same network device. In some embodiments of the present application, the TRPs may be included in two different network devices.

As shown in FIG. 1, for example, the environment 100 may communicate with the terminal device 130 via at least one of TRP 110 and TRP 120. The TRP 110 and the TRP 120 may be included in same serving cells or different serving cells. Although some embodiments of the present disclosure are described with reference to the TRP 110 and TRP 120 within same serving cells, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

The network device needs channel state information for transmission scheduling or transmission parameter selection or configuration. A network device transmits configurations for CSI reporting in a CSL reporting setting to the terminal device 130 by means of for example, Radio Resource Control (RRC) signaling. Based on the configurations in the CSI reporting setting, the terminal device 130 perform measurements, for example channel measurement and/or interference measurement, and transmits an CSI report to the network devices.

The embodiments of the present disclosure can be applied in the CSI reporting and the CSI reporting setting in the communication environment 100 and details will be described hereinbelow with reference to FIGS. 2 to 11.

Figure 2:
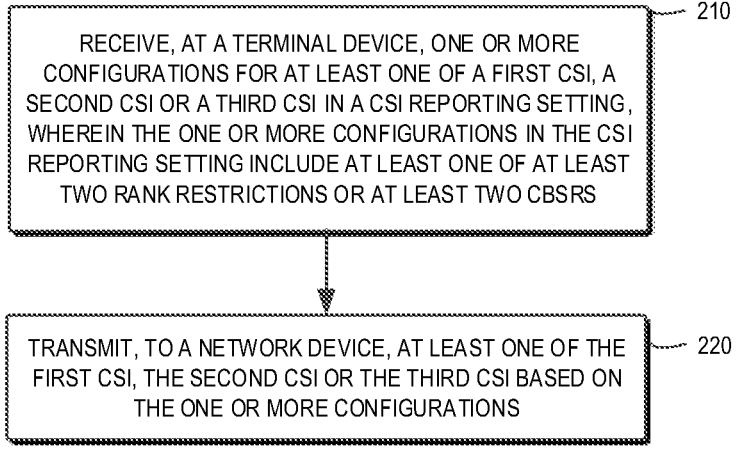
FIG. 2 illustrates a flowchart of a communication method according to an embodiment of the present disclosure.

FIG. 2 illustrates a flowchart of an example method 200 for communication according to embodiments of the present application. The communication method 200 could be performed at a terminal device such as UE 130.

As shown in FIG. 2, in block 210, the terminal device receives, one or more configurations for at least one of a first Channel State Information (CSI), a second CSI or a third CSI in a CSI reporting setting. The one or more configurations in the CSI reporting setting include at least one of at least two rank restrictions or at least two codebook. In block 220, the terminal device may transmit, to a network device, at least one of the first CSI, the second CSI or the third CSI based on the one or more configurations.

Detailed about solutions about the CSI reporting setting and the CSI reporting will be described hereinafter with references to FIG. 3 to 11.

Figure 3:
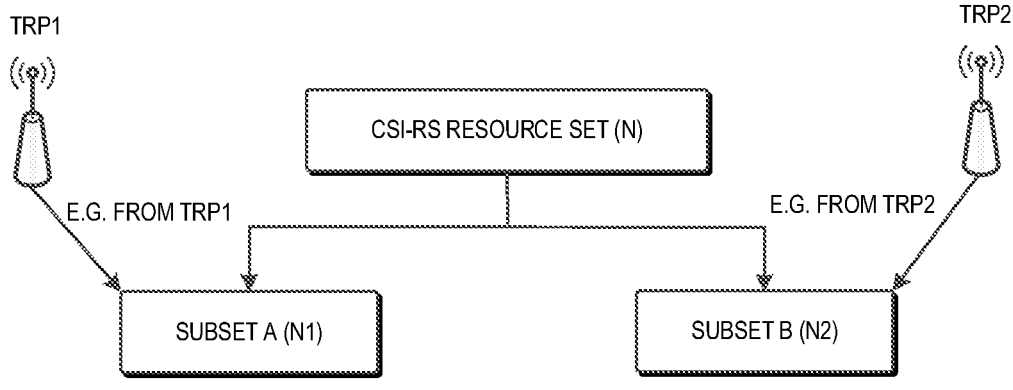
FIG. 3 illustrates a schematic diagram of CSI reporting according to an embodiment of the present disclosure.

FIG. 3 illustrates a schematic diagram of CSI reporting according to an embodiment of the present disclosure. As illustrated in FIG. 3, in some embodiments of the present disclosure, there may be N (N is a positive integer, and for example, 2<=N=64) CSI-RS resources within a CSI-RS resource set, and each CSI-RS resource may be associated with one Transmission Configuration Indicator (TCI) state. For example, the TC state is configured via at least one of RRC, MAC CE and DCI signalling, which includes configurations the quasi co-location relationships. In some embodiments, the N CSI-RS resources may be divided into two subsets (subset A and subset B). The subset A comprises, for example, N1 (N1 is a positive integer, and for example, 1<=N1<=N−1) CSI-RS resources, and subset B comprises N2 (N2 is a positive integer, and for example, N2=N−N1) CSI-RS resources. For example, N1 CSI-RS resources in subset A are those resources for CSI measurement related to TRP 1 and N2 CSI-RS resources in subset B are those resources for CSI measurement related to TRP 2.

The CSI-RS resources may be mapped to subsets A and B in different ways. In some embodiments of the present disclosure, each of subset A and subset B includes a half of the CSI-RS resources. For example, subset A includes the first half of the CSI-RS resources and subset B includes the second half of the CSI-RS resources. For example, N1=ceil (N/2), and N2=N−N1. For another example, N1=floor(N/2), and N2=N−N1. For another example. N1=N/2, and N2=N/2. In some embodiments of the present disclosure, it is also possible to maintain a resource list for each of subset A and subset B respectively. For example, a list of CSI-RS resource is maintained for subset A and the another list of CSI-RS resources is maintained for subset B. In such a case, the number of CSI-RS resources in subset A can be same to or different from that in subset B.

In some embodiments of the present disclosure, the CSI report may have three CSIs, including for example CSI A, CSI B, and CSI C. Amongst the three CSIs, CSI A and/or CSI B may be CSIs for the single TRP transmission. For example, they can be related to two TRPs respectively. The CSI C can be CSIs used for NCJT scenario.

It is to be noted that in a CSI report instance, it is possible to include at least one of CSI A, CSI B and CSI C according to network configuration or requirements. For example, for the single TRP transmission, the terminal device may report only the optimal CSI among CSIs regarding TRP 1 and TRP 2, or report both the optimal CSI related to TRP 1 and the optimal CSI related to TRP 2. Alternatively, the CSI report may include CSI C for NCJT scenario. Or additionally, the CSI report may include CSI C for NCJT scenario in addition to one or both of CSI A and CSI B. In the CSI reporting setting from the network device, it may also include configurations for at least one CSI, e.g. at least one of CSI A, CSI B, or CSI C. Hereinafter, reports of CSI A, CSI B and CSI C will be described in details with reference to the accompanying drawings.

CSI A/B for the Single TRP Transmission

In some embodiments of the present application, the CSI report may include one or both of CSI A and CSI B. For example, it is possible to report only one CRT in CSI A and/or CSI B (e.g. for the single TRP transmission), and the CRI may correspond to one CSI-RS resource in the CSI-RS resource set. In some embodiments of the present application, the CSI is determined from N CSI-RS resources in the CSI-RS resource set and only the CSI, for example CSI A or CSI B, is reported.

Figure 4:
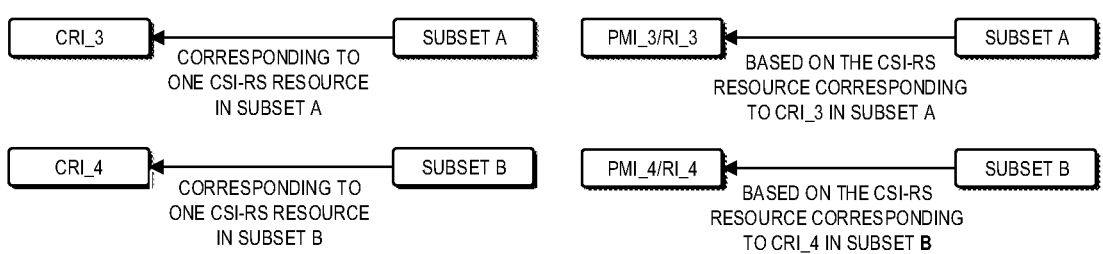
FIG. 4 illustrates a schematic diagram of CSI reporting according to an embodiment of the present disclosure.

As illustrated in FIG. 4, in some embodiments, for CSI A, it may include at least one of one CRI (a first CRI CRI_1), one PMI (a first PMI PMI_1) and one RI ta first RI RI_1)). In some embodiments, for CSI B, it may include at least one of one CRI (a second CRI CRI_2), one PMI (a second PMI PMI_2) and one RI (a second RI RI_1)). In some embodiments, the bit size for the CRI in CSI A or B can be determined as ceil(log 2(N)). In some embodiments, the bit size for the CRI in CSI A or B can be determined as ceil(log 2(max(N1, (N−N1)). For example, in the CSI reporting setting, there may be configuration for only one CSI with one CRI, which can be applied to either CSI A or CSI B. Alternatively, the CSI reporting setting may also include two CSI each with one CRI applied to CSI A and CSI B respectively.

CSI C for Multi-TRP Transmission

In some embodiments of the present application, the CSI C (e.g., for NCJT scenario) can include two CRIs (a first CRI CRI_3 and a second CRI CRI_4), two RIs ta first RI RI_3 and a second RI RI_4) and two PMIs (a first PMI PMI_3 and a second PMI PMI_4) as illustrated in FIG. 4. The CRI_3 may correspond to a CSI-RS resource (C1) in subset A, and CRI_4 may correspond to a CSI-RS resource (C2) in subset B. For instance. PMI_3 can be calculated based on C1 as channel measurement resource (CMR) and/or calculated based on C2 as Interference Measurement Resource (IMR), and PMI_4 can be calculated based on C2 as CMR and/or based on C1 as IMR. In such a case, bit size for CRI_3 can be determined as ceil(log 2 (N1)), and bit size for CRI_4 can be determined as ceil(log 2(N−N1)).

Figure 5:
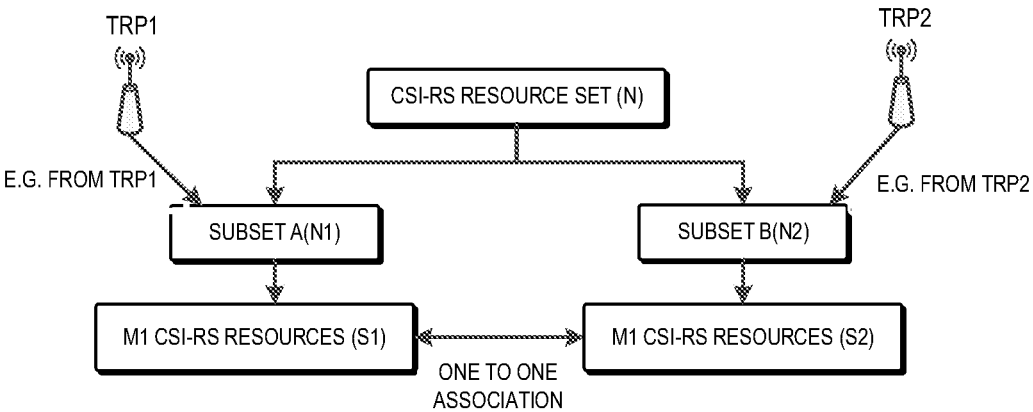
FIG. 5 illustrates a schematic diagram of CSI reporting according to an embodiment of the present disclosure.

FIG. 5 illustrates another solution for CSI reporting according to embodiments of the present application. As illustrated in FIG. 5, similarly, a CSI-RS resource set includes N (N is a positive integer, and for example, 2<=N<=64) CSI-RS resources, each CSI-RS resource is associated with one TCI state. The N CSI-RS resources may be divided into two subsets (subset A and subset B), wherein subset A comprises N1 (N1 is a positive integer. For example, 1<=N1<=N−1) CSI-RS resources, and subset B comprises N2 (N2 is a positive integer, and for example, N2=N−N1) CSI-RS resources. In subset A, there are M (M is a positive integer. For example, 1<=M<=N1. For another example, 1<=M<=max(N1, (N−N1))) CSI-RS resources (S1) associated with M CSI-RS resources (S2) in subset B. For example, each CSI-RS resource in S1 is associated with one CSI-RS resource in S2. In other words, association relationship is built between two CSI_RS resources in each of M pairs of CSI_RS resources for the subsets A and B. By means of such association relationship, it is possible to reduce the computation complexity of CSI measurement and/or the overhead of CSI reporting.

In some embodiments, in a CSI reporting setting, it may include at least one CSI, e.g. at least one of CSI A, CSI B, CSI C. For CSI A and/or B (e.g. for single TRP transmission), the CSI reporting can be the same as those described with reference to FIG. 3, i.e., including at least one of one CRI one PMI and one RI. Particularly each of CSIs, one CRI is reported and corresponds to a CSI-RS resource in the CSI-RS resource set. Unlike the CSI reporting as illustrated in FIG. 3 in which two CRIs are reported for CSI C (e.g. for NCJT hypothesis), it is possible to report only one CRI for CSI C, which corresponds to both of the CSI-RS resource in subset A and the associated CSI-RS resource in subset B. Hereinafter, reports of CSI A, CSI B and CSI C will be described in details.

CSI A/B for the Single TRP Transmission

In some embodiments of the present disclosure, only one of CSI A and CSI B may be reported (e.g. for the single TRP transmission). For example, the CSI is determined from N CSI-RS resources in the CSI-RS resource set and only one of CSI A or CSI B is reported. In some embodiments, the bit size for the CRI in CSI A or B can be determined as ceil(log 2(N)). In some embodiments, the bit size for the CRI in CSI A or B can be determined as ceil(log 2(max(N1,(N−N1))). In some embodiments, the CSI reporting setting may include configuration for the only one CSI with one CRI. For example, when there is only one of CSI A or CSI B (e.g. for single TRP transmission).

In some embodiments of the present disclosure, both CSI A and CSI B can be reported (e.g. for the single TRP transmission). In some embodiments, bit size for CRI in CSI A may be determined as ceil(log 2(N1)), and bit size for CRI in CSI B may be determined as ceil(log 2(N−N1)). In some embodiments, bit size for CRI in CSI A may be determined as ceil(log 2(N)), and bit size for CRI in CSI B may be determined as ceil(log 2(N)). In some embodiments, bit size for CRI in CSI A may be determined as ceil(log 2(max(N1, (N−N1))), and hit size for CRI in CSI B may be determined as ceil(log 2(max(N1,(N−N1))). For example, in such a case, the CSI reporting setting may include configurations for two CSIs each with one CRI.

In some embodiments of the present application, the bit size for CRI in CSI A may be determined as ceil(log 2(N1−M)), and the bit size for CRI in CSI B may be determined as ceil(log 2(N−N1−M)). For example, the M pairs of CSI-RS cannot be used for the single TRP transmission. In such a case, the CSI reporting setting may include configurations for two CSIs each with one CRI)).

CSI C for Multi-TRP Transmission

Figure 6:
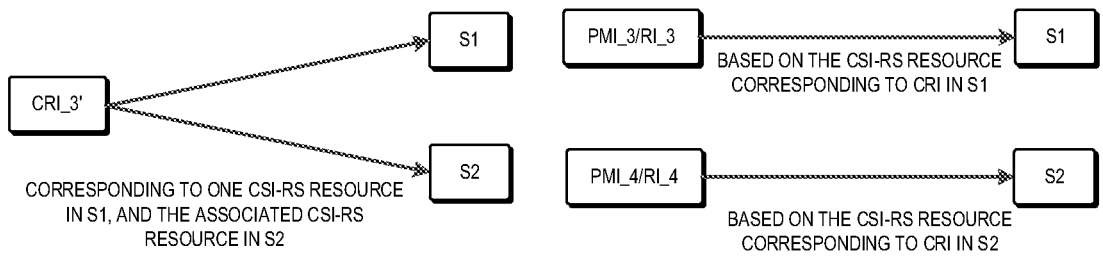
FIG. 6 illustrates a schematic diagram of CSI reporting according to an embodiment of the present disclosure.

When there are M associated CSI-RS resource pairs in subsets A and B, it is possible to report only one CRI for CSI C (e.g., for NCJT scenario). As illustrated in FIG. 6, only one CRI CRI_3' is reported for multi-TRP transmission and the CRI CRI_3' may correspond to both one CSI-RS resource in S1 and the associated CSI-RS resource in S2. In some embodiments, the bit size for the CRI in CSI C may be determined as ceil(log 2(M)).

In some embodiments, the CSI C may further include two PMIs PMI_3, PMI_4 and/or two RIs RI_3, RI_4. For instance, PMI_3/RI_3 can be determined based on the CSI-RS resource corresponding to CRI in S1, and PMI_4/RI_4 can be determined based on the CSI-RS resource corresponding to CRI in S2.

FIG. 7 illustrates a further solution for CSI reporting according to embodiments of the present application, wherein two CSI-RS resources in different subsets are associated for multi-TRP transmission in a different manner. In some embodiments, as illustrated in FIG. 7, the CSI-RS resource set includes for example N (N is a positive integer. For example, 2<=N<=64) CSI-RS resources and is divided into two groups G1 and G2. In group G1, there are N1 (N1 is an integer, and 2<=N1<=N) CSI-RS resources wherein each CSI-RS resource is associated with two TCI states. In group G2, there are N2 (e.g., N2=N–N1) CSI-RS resources wherein each CSI-RS resource is associated with one TCI state. In the group G1. CSI-RS resources associated with same two TC states are considered as a pair of CSI-RS resources and associated with each other. For example, the pair of two CSI-RS resources can be used for NCJT scenario.

Alternatively, in some embodiments, in group G1, them can be N3 (N3 is an integer, and 1<=N3<=floor(N/2)) CSI-RS resource pairs wherein each CSI-RS resource in a resource pair is associated with two TCI states, as illustrated in FIG. 8. In such a case, N3=N1/2 or N1=2*N3 and group G1 includes N2 (N2=N–2*N3) CSI-RS resources.

In some embodiments of the present disclosure, the CSI reporting setting may include configurations for at least one CSL, e.g. at least one of CSI A, CSI B, CSI C. For each of CSIs A or B (e.g. for single TRP transmission), at least one of one CRI, one PMI and one RI may be reported, and the CRI may correspond to one CSI-RS m-source associated with one TCI state in the CSI-RS resource set. For CSI C (e.g. NCJT hypothesis), one CRI, two PMIs and two RIs may be reported, and the CRI may correspond to two CSI-RS resources or a pair of CSI-RS resources which are associated with same two TCI states in G1. Hereinafter, reports of CSI A, CSI B and CSI C will be described in details.

CSI A/B for the Single TRP Transmission

In some embodiments of the present disclosure, the CSI reporting setting include configuration on only one CSI with one CRI. For example, CSI-RS resources in G1 are dedicated to the multiple TPR transmission and the CSI-RS resources in G2 are dedicated to the single TPR transmission. In some embodiments, bit size for CRI in CSI A or CSI B may be determined as ceil(log 2(N–N1)). For example, the CSI report includes only one of CSI A and CSI B. For another example, the CSI report further includes CSI C.

In some embodiments of the present disclosure, the CSI reporting setting may include configuration on only one CSI with one CRI. For example, the CSI-RS resources in G1 is dedicated to the multiple TPR transmission but the CSI-RS resources in both G1 and G2 can be used for the single TPR transmission. In some embodiments, if the corresponding CSI-RS resource is associated with two TCI states, one of the two TCI states may be used for channel measurement for CSI A or CSI B. For example, the first one of the two TCI states can be applied. For another example, there may be two CSI-RS associated with same two TCI state, and for the first CSI-RS resource, the first one of the two TCI states may be used, and for the second CSI-RS resource, the second one of the two TCI states may be used. In some embodiments, bit size for CRI in CSI A or CSI B may be determined as ceil(log 2(N)). For example, the CSI report includes only one of CSI A and CSI B. For another example, the CSI report further includes CSI C.

In some embodiments of the present disclosure, the CSI reporting setting may include configuration on two CSIs each with one CRI, and in such a case, both CSI A and CSI B can be reported. In some embodiments, bit size for CRI in CSI A or B is ceil (log 2(N–N1)). For example, if the single TPR transmission can only use the CSI-RS resources in G2.

In some embodiments, bit size for CRT in CSI A or B is ceil(log 2(N)). For example, if the single TPR transmission can use all resources in the CSI-RS resource set. In some embodiments, if the corresponding CSI-RS resource is associated with two TCI states, one of the two TCI states may be used for channel measurement for CSI A or CSI B. For example, the first one of the two TCI states can be applied. For another example, there may be two CSI-RS associated with same two TCI state, and for the first CSI-RS resource, the first one of the two TCI states may be used, and for the second CSI-RS resource, the second one of the two TCI states may be used.

CSI C for Multi-TRP Transmission

In some embodiments, the CSI C (e.g. for NCJT hypothesis) may include one CRI CRI_3 and/or two PMIs PMI_3, PMI_4 and/or two RIs RI_3, RI_4. For example, due to the association of the CSI-RS resources in G1. As illustrated in FIG. 9. CRI_3 may correspond to two CSI-RS resources associated with same two TCI states in the CSI-RS resource set G1. In some embodiments, bit size for CRI in CSI C may be determined as ceil(log 2(N1/2)) or ceil(log 2(N3)).

In some embodiments, each values of CRI may correspond to the first CSI-RS resource of two CSI-RS resources associated by same two TCI states. For example, for the CSI-RS resources with same two TCI states, only the first the CSI-RS resource is counted for CRI index and the second one is not counted in CRI index determination. In some embodiments, the values of the CRI are associated with increasing order of CSI-RS resources, and the CSI-RS resources are associated with different two TC states.

As an example, there are four CSI-RS resources in G1, CSI-RS resource Re1 (TC1 states T1, T2), CSI-RS resource Re2 (TC1 states T1, T2). CSI-RS resource Re3 (TCI states T3, T4), CSI-RS resource Re4 (TC states T3, T4). Amongst the four resources, the first CSI-RS resource Re1 is associated with the second CSI-RS resource Re2 with same TC states T1. T2 and, the third CSI-RS resource Re3 is associated with the fourth CSI-RS resource Re4 with same TCI states T3, T4. In such a case, only CSI-RS resource Re1 in the first pair of associated CSI-RS resources and CSI-RS resource Re3 in the second pair of associated CSI-RS resources are counted in CRI index. For example, for the first pair of associated CSI-RS resources Re1 and Re2, CRI may be determined as CRI=0 and for the second pair of associated CSI-RS resources Re3 and Re4, CRI may be determined as CRI=1, and so on.

As another example, there are four CSI-RS resources in G1. CSI-RS resource Re1 (TCI states T1, T2), CSI-RS resource Re2 (TCI states T3, T4), CSI-RS resource Re3 (TCI states T1, T2). CSI-RS resource Re4 (TC states T3, T4). Amongst the four resources, the first CSI-RS resource Re1 is associated with the third CSI-RS resource Re3 with same TC states T1, T2 and, the second CSI-RS resource Re2 is associated with the fourth CSI-RS resource Re4 with same TCI states T3, T4. In such a case, only CSI-RS resource Re1 in the first pair of associated CSI-RS resources and CSI-RS resource Re2 in the second pair of associated CSI-RS resources are counted in CRI index. For example, for the first pair of associated CSI-RS resources Re1 and Re3, CRI may be determined as CRI=0 and for the second pair of associated CSI-RS resources Re2 and Re4. CRI may be determined as CRI=1, and so on.

In some embodiments of the present application, PMI_3/RI_3 may be calculated/determined based on the CSI-RS resource Re1 corresponding to CRT in G1, and PMI_4/RI_4 may be calculated/determined based on the CSI-RS resource Re2 corresponding to CRT in G1.

For facilitating the comprehension of the present disclosure. FIG. 10 illustrates a high level diagram of CSI reporting and CSI report setting according to embodiments of the present application. As illustrated in FIG. 10, the CSI reporting setting may include configurations for at least one of the CSI A, CSI B and CSI C. For example, amongst the three CSIs, CSI A and/or CSI B may be used for e.g. single TRP transmission and they may be related to two TRPs respectively. Different from CSI A/CSI B, CSI C may be used for NCJT scenario. In some embodiments, the CSI report may be based on configurations in the CSI reporting setting. For example, if the CSI reporting setting contains configurations for only one CSI with one CRI (e.g. for the single TRP transmission), the terminal device can only report one of the CSI A or CSI B or the terminal device only reports CSI A. For another example, if the CSI reporting setting contains configurations for two CSIs each with one CRI (e.g. for the single TRP transmission), the terminal device can report both of the CSI A and CSI B. Additionally or alternatively, in some embodiments, the CSI reporting setting may include CSI C. For example, in a case where the CSI reporting seating contains configuration on CSIs for both the multi-TRP transmission and the single TRP transmission, the terminal device may report the CSI for the single transmission or multi-transmission or report both of them. In some embodiments, in a CSI report, CSI A and CSI C may be reported. In some embodiments, in a CSI report, CSI A and CSI B and CSI C may be reported. In some embodiments, in a CSI report, CSI C may be reported. In some embodiments, in a CSI report, one of CSI A and CSI C may be reported.

In some further embodiments of the present disclosure, or alternatively in another aspect of the present application, the CSI reporting setting may include at least one of two rank restrictions or at least two codebook subset restrictions (CBSRs). For example, the rank restrictions and CBSRs may be related to with the single TRP transmission or the multi-TRP transmission.

Figure 11:
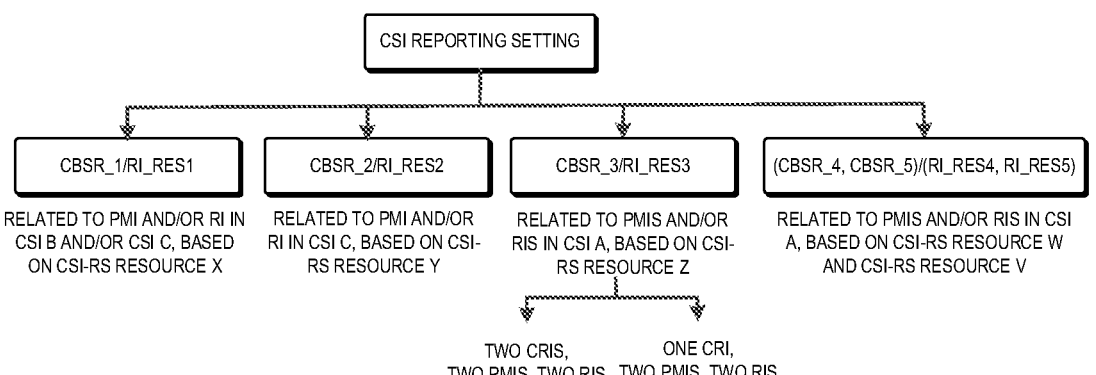
FIG. 11 illustrates a schematic diagram of CSI reporting setting according to an embodiment of the present disclosure.

FIG. 11 illustrates example configurations contained in the CSI reporting setting according to some embodiments of the present applications. As illustrated in FIG. 11, in some embodiments, the CBSRS may comprise at least one of a first CBSR CBSR_1, a second CBSR CBSR_2, a third CBSR CBSR_3, a fourth CBSR CBSR_4 and a fifth CBSR CBSR_5. Additionally or alternatively, in some embodiments, the rank restrictions may include at least one of a first rank indicator (RI) restriction RI-Res1, a second RI restriction RI-Res2, a third RI restriction RI-Res3, a fourth RI restriction RI-Res4 and a fifth RI restriction RI-Res5.

In some embodiments of the present disclosure, the first CBSR CBSR_1 and/or the first RI restriction RI-Res1 may be related to the first CSI (e.g. CSI_A, for the single TRP transmission). In some embodiments, the first CBSR CBSR_1 and/or the first RI restriction RI-Res1 may be used for the PMI calculation (or CSI measurement or RI calculation or PMI reporting or RI reporting or CQI calculation) related to some of CSI-RS resources, for example, represented as CSI-RS resource X. The CSI-RS resource X may include for example at least one of the CSI-RS resources in subset A, or at least one of the CSI-RS resources with one TC1 state (e.g. those for single TRP transmission hypothesis, or those associated with TRP1). As another example, CSI-RS resource X may include at least one of the CSI-RS resources in the CSI-RS resource set, or at least one of the CSI-RS resources with one TCI state (e.g. those for single TRP transmission hypothesis, or those associated with either TRP1 or TRP2).

Alternatively or additionally, the second CBSR CBSR_2 and/or the second RI restriction RI-Res2 are related to the second CSI (e.g. CSI B for the single TRP transmission). In some embodiments, the second CBSR CBSR_2 and/or the second RI restriction RI_res2 may be applied for the PMI calculation (or CSI measurement or RI calculation or PMI reporting or RI reporting or CQI calculation) related to some CSI-RS resources, for example, represented as CSI-RS resource Y. The CSI-RS resource Y may include at least one of the CSI-RS resources in subset B or at least one of the CSI-RS resources with one C1 state (for example those for single TRP transmission hypothesis, or those associated with TRP2).

In some embodiments, for the first RI restriction and/or the second RI restriction, the bit size is 8. In some embodiments, for the first RI restriction and/or the second RI restriction, the bit size is 4. The example first and second CSI-RS resource restrictions including first and second RI restrictions and the example first and second CBSRs are given as follows only for illustration purposes.

Example RI Restrictions ri-Restriction-1 (e.g. RI_res1) BIT STRING (SIZE (8))
ri-Restriction-2 (e.g. RI_res2) BIT STRING (SIZE (8))
or
ri-Restriction-1 (e. RI_res1) BIT STRING (SIZE (4))
ri-Restriction-2 (e.g. RI_res2) BIT STRING (SIZE (4))

In the example R restrictions, RI_res1 may be used for CSI A, and/or RI_res2 may be used for CSI B. For example, both the two RI restrictions are used for the single TRP transmission wherein the underlined restriction may represent the first RI restriction RI_Res1 for single TRP transmission report, for example related to TRP 1, the another restriction may represent the second RI restriction RI_Res2 for single TRP transmission report, for example related to TRP 2.

Example CBSR Restrictions

| nrOfAntennaPorts | CHOICE { | |
| --- | --- | --- |
| two | SEQUENCE { | |
| twoTX-CodebookSubsetRestriction-1 (e.g. CBSR_1) | | BIT STRING (SIZE (6)) |
| twoTX-CodebookSubsetRestriction-2 (e.g. CBSR_2) | | BIT STRING (SIZE (6)) |
| } | | |
| moreThanTwo | SEQUENCE | |
| n1-n2 | CHOICE { | |
| two-one-TypeI-SinglePanel-Restriction-1 (e.g. CBSR_1) | | BIT STRING (SIZE (8)), |
| two-two-TypeI-SinglePanel-Restriction-1 (e.g. CBSR_1) | | BIT STRING (SIZE (64)), |

-continued

| | |
|---|---|
| four-one-TypeI-SinglePanel-Restriction-1 (e.g. CBSR_1) (SIZE (16)), | BIT STRING |
| three-two-TypeI-SinglePanel-Restriction-1 (e.g. CBSR_1) (SIZE (96)), | BIT STRING |
| six-one-TypeI-SinglePanel-Restriction-1 (e.g. CBSR_1) (SIZE (24)), | BIT STRING |
| four-two-TypeI-SinglePanel-Restriction-1 (e.g. CBSR_1) (SIZE (128)), | BIT STRING |
| eight-one-TypeI-SinglePanel-Restriction-1 (e.g. CBSR_1) (SIZE (32)), | BIT STRING |
| four-three-TypeI-SinglePanel-Restriction-1 (e.g. CBSR_1) (SIZE (192)), | BIT STRING |
| six-two-TypeI-SinglePanel-Restriction-1 (e.g. CBSR_1) (SIZE (192)), | BIT STRING |
| twelve-one-TypeI-SinglePanel-Restriction-1 (e.g. CBSR_1) (SIZE (48)), | BIT STRING |
| four-four-TypeI-SinglePanel-Restriction-1 (e.g. CBSR_1) (SIZE (256)), | BIT STRING |
| eight-two-TypeI-SinglePanel-Restriction-1 (e.g. CBSR_1) (SIZE (256)), | BIT STRING |
| sixteen-one-TypeI-SinglePanel-Restriction-1 (e.g. CBSR_1) (SIZE (64)) | BIT STRING |
| two-one-TypeI-SinglePanel-Restriction-2 (e.g. CBSR_2) (SIZE (8)), | BIT STRING |
| two-two-TypeI-SinglePanel-Restriction-2 (e.g. CBSR_2) (SIZE (64)), | BIT STRING |
| four-one-TypeI-SinglePanel-Restriction-2 (e.g. CBSR_2) (SIZE (16)), | BIT STRING |
| three-two-TypeI-SinglePanel-Restriction-2 (e.g. CBSR_2) (SIZE (96)), | BIT STRING |
| six-one-TypeI-SinglePanel-Restriction-2 (e.g. CBSR_2) (SIZE (24)), | BIT STRING |
| four-two-TypeI-SinglePanel-Restriction-2 (e.g. CBSR_2) (SIZE (128)), | BIT STRING |
| eight-one-TypeI-SinglePanel-Restriction-2 (e.g. CBSR_2) (SIZE (32)), | BIT STRING |
| four-one-TypeI-SinglePanel-Restriction-2 (e.g. CBSR_2) (SIZE (192)), | BIT STRING |
| six-two-TypeI-SinglePanel-Restriction-2 (e.g. CBSR_2) (SIZE (192)), | BIT STRING |
| twelve-one-TypeI-SinglePanel-Restriction-2 (e.g. CBSR_2) (SIZE (48)), | BIT STRING |
| four-four-TypeI-SinglePanel-Restriction-2 (e.g. CBSR_2) (SIZE (256)), | BIT STRING |
| eight-two-TypeI-SinglePanel-Restriction-2 (e.g. CBSR_2) (SIZE (256)), | BIT STRING |
| sixteen-one-TypeI-SinglePanel-Restriction-2 (e.g. CBSR_2) (SIZE (64)) | BIT STRING |
| }, | |
| typeI-SinglePanel-codebookSubsetRestriction-i2-1 (e.g. CBSR-i2_1) STRING (SIZE (16)) | BIT |
| typeI-SinglePanel-codebookSubsetRestriction-i2-2 (e.g. CBSR-i2_2) (SIZE (16))       OPTIONAL       -- Need R | BIT STRING |
| } | |
| }, | |

In the above example CBSR restrictions, the underlined CBSRs restrictions (e.g. CBSR_1 and/or CBSR-i2_1) may represent the first CBSR CBSR_1 for CSI A (for example, for single TRP transmission CS report, for example related to TRP 1); the other CBSR restrictions (e.g. CBSR_2 and/or CBSR-i2_2) may represent the second CBSR CBSR_2 for CSI B (for example, for single TRP transmission CSI report, for example related to TRP 2).

In some embodiments, the first CBSR (e.g. CBSR_1 may correspond to pre-coder(s) which are not allowed for reporting of the first PMI in CSI A, in some embodiments, the first CBSR (e.g. CBSR-i2_1) may correspond to pre-coder(s) which are not allowed to be selected for calculation of CQI in CSI A. In some embodiments, the first RI restriction (e.g. RI_res1) may define a first number of layers, and pre-coder(s) associated with the first number of layers are not allowed for reporting of the first PMI and/or reporting of the first RI in CSI A. In some embodiments, the first RI restriction (e.g. RI_res1) may define a first number of layers, the first number of layers am not allowed for reporting of the first RI in CSI A. In some embodiments, the second CBSR (e.g. CBSR_2) may correspond to pre-coder(s) which are not allowed for reporting of the second PMI in CSI B. In some embodiments, the second CBSR (e.g. CBSR-i2_2) may correspond to pre-coder(s) which are not allowed to be selected for calculation of CQI in CSI B. In some embodiments, the second RI restriction (e.g. RI_res2) may define a second number of layers, and pre-coder(s) associated with the second number of layers are not allowed for reporting of the second PMI and/or reporting of the second RI in CSI B. In some embodiments, the second RI restriction (e.g. RI_res2) may define a second number of layers, the second number of layers are not allowed for reporting of the second RI in CSI B.

The restriction CBSR_1 may define pre-coder(s) related to PMI_1 which are not allowed for CQI calculation; the restriction RI_res1 may define RI(s) which are not allowed for PMI_1 and/or RI_1 reporting. Thus, based on the RI_res1 and CBSR_1, reporting of at least one of the first PMI and the first RI can be restricted. Alternatively or additionally, the restriction CBSR_2 may define pre-coder(s) related to PMI_2 which are not allowed for CQI calculation; the restriction RI_res2 may define RI(s) which are not allowed for PMI_2 and/or RI_2 reporting. Thus, based on the RI_res1 and CBSR_1 reporting of at least one of the second PMI and the second RI can be restricted. Thus, the computation complexity and the overhead can be further reduced.

Alternatively or additionally, the third CBSR CBSR_3 and/or the third RI restriction RI-Res3 are related to CSI C (e.g. for the multi-TRP transmission). In some embodiments, the third CBSR CBSR_3 and/or the third RI restriction RI_res3 may be applied for the two PMIs (PMI_3 and PMI_4) calculation/reporting and/or two RIs (RI_3 and RI_4) calculation/reporting (or CSI measurement/reporting) and/or calculation of CQI in CSI C related to some CSI-RS resources for example represented as CSI-RS resource Z. The CSI-RS resource Z may include the CSI-RS resources (e.g. for the NCJT hypothesis). For example, the CSI-RS resource Z may include at least one of the CSI-RS resources in subset A, and the CSI-RS resources in subset B associated with a CSI-RS resource in subset A (e.g. for the NCJT hypothesis), or CSI-RS resources with two TC1 states (e.g. for the NCJT hypothesis), etc.

In some embodiments, the third CBSR CBSR_3 may correspond to pre-coders (For example, pre-coder pairs (e.g., P1 and P2)) which are not allowed for reporting of the third PMI and the fourth PMI in CSI C. For example, P1 corresponds to pw-coder(s) which are not allowed for reporting of the third PMI. For another example, P2 corresponds to pre-coder(s) which are not allowed for reporting of the fourth PMI. In some embodiments, the third CBSR CBSR_3 may correspond to pre-coders (For example, pre-coder pairs (e.g., P1 and P2)) which are not allowed to be selected for calculation of CQI in CSI C. In some embodiments, the third RI restriction RI_res3 may define a third number of layers and a fourth number of layers, and pre-coder(s) associated with the third number of layers are not allowed for reporting of the third PMI and/or reporting of the third RI in CSI C, and pre-coder(s) associated with the fourth number of layers are not allowed for reporting of the fourth PMI and/or reporting of the fourth RI in CSI C. In some embodiments, the third RI restriction RI_res3 may define a third number of layers and a fourth number of layers, and the third number of layers are not allowed for reporting of the third RI in CSI C, and the fourth number of layers are not allowed for reporting of the fourth RI in CSI C.

The CBSR_3 may define pre-coder pairs (e.g., P1 and P2) not allowed for CQI calculation, wherein P1 is related to PMI_1, P2 is related to PMI_2. The restriction RI_res3 defines RI pairs (R1 and R2) not allowed for PMI and/or RI reporting, and RI is related to the first RI reporting RI_3, and R2 is related to the second RI reporting RI_4. Thus, reporting of the third and fourth PMIs can be restricted based on at least one of the third CBSR and the third RI restriction; and reporting of the third and fourth RIs can be restricted based on at least one of the third CBSR and the third RI restriction.

The example third CRI-RS resource restrictions including example RI and CBRS restrictions are given as follows only for illustration purposes.

Example R Restriction ri-Restriction-3 (e.g. RI_res3) BIT STRING (SIZE 8)

Example RI Restriction ri-Restriction-3 (e.g. RI_res3)
R1 BIT STRING (SIZE (4))
R2 BIT STRING (SIZE (4))

In the first example RI restriction, the first 4 bits in RI_res3 may be applied for Rank restriction R1 related to reporting of the third RI and/or reporting of the third PMI in CSI C, and the remaining 4 bits in RI_res3 may be applied for Rank restriction R2 related to reporting of the fourth RI and/or reporting of the fourth PMI in CSI C. In the second example RI restriction, it may include two separate parts for R1 and R2 respectively, each with a bit size of 4.

Example CBSR Restrictions

| nrOfAntennaPorts | CHOICE { | |
|---|---|---|
| two | SEQUENCE { | |
| twoTX-CodebookSubsetRestriction-3 (e.g. CBSR_3_1) (SIZE (6)) | | BIT STRING |
| twoTX-CodebookSubsetRestriction-3 (e.g. CBSR_3_2) (SIZE (6)) | | BIT STRING |
| } | | |
| moreThanTwo | SEQUENCE | |
| n1-n2 | CHOICE { | |
| two-one-TypeI-SinglePanel-Restriction-3 (e.g. CBSR_3_1) (SIZE (8)), | | BIT STRING |
| two-two-TypeI-SinglePanel-Restriction-3 (e.g. CBSR_3_1) (SIZE (64)), | | BIT STRING |
| four-one-TypeI-SinglePanel-Restriction-3 (e.g. CBSR_3_1) (SIZE (16)), | | BIT STRING |
| three-two-TypeI-SinglePanel-Restriction-3 (e.g. CBSR_3_1) (SIZE (96)), | | BIT STRING |
| six-one-TypeI-SinglePanel-Restriction-3 (e.g. CBSR_3_1) (SIZE (24)), | | BIT STRING |
| four-two-TypeI-SinglePanel-Restriction-3 (e.g. CBSR_3_1) (SIZE (128)), | | BIT STRING |
| eight-one-TypeI-SinglePanel-Restriction-3 (e.g. CBSR_3_1) (SIZE (32)), | | BIT STRING |
| four-three-TypeI-SinglePanel-Restriction-3 (e.g. CBSR_3_1) (SIZE (192)), | | BIT STRING |
| six-two-TypeI-SinglePanel-Restriction-3 (e.g. CBSR_3_1) (SIZE (192)), | | BIT STRING |

-continued

| | |
|---|---|
| twelve-one-TypeI-SinglePanel-Restriction-3 (e.g. CBSR_3_1) (SIZE (48)), | BIT STRING |
| four-four-TypeI-SinglePanel-Restriction-3 (e.g. CBSR_3_1) (SIZE (256)), | BIT STRING |
| eight-two-TypeI-SinglePanel-Restriction-3 (e.g. CBSR_3_1) (SIZE (256)), | BIT STRING |
| sixteen-one-TypeI-SinglePanel-Restriction-3 (e.g. CBSR_3_1) (SIZE (64)) | BIT STRING |
| two-one-TypeI-SinglePanel-Restriction-3 (e.g. CBSR_3_2) (SIZE (8)), | BIT STRING |
| two-two-TypeI-SinglePanel-Restriction-3 (e.g. CBSR_3_2) (SIZE (64)), | BIT STRING |
| four-one-TypeI-SinglePanel-Restriction-3 (e.g. CBSR_3_2) (SIZE (16)), | BIT STRING |
| three-two-TypeI-SinglePanel-Restriction-3 (e.g. CBSR_3_2) (SIZE (96)), | BIT STRING |
| six-one-TypeI-SinglePanel-Restriction-3 (e.g. CBSR_3_2) (SIZE (24)), | BIT STRING |
| four-two-TypeI-SinglePanel-Restriction-3 (e.g. CBSR_3_2) (SIZE (128)), | BIT STRING |
| eight-one-TypeI-SinglePanel-Restriction-3 (e.g. CBSR_3_2) (SIZE (32)), | BIT STRING |
| four-one-TypeI-SinglePanel-Restriction-3 (e.g. CBSR_3_2) (SIZE (192)), | BIT STRING |
| six-two-TypeI-SinglePanel-Restriction-3 (e.g. CBSR_3_2) (SIZE (192)), | BIT STRING |
| twelve-one-TypeI-SinglePanel-Restriction-3 (e.g. CBSR_3_2) (SIZE (48)), | BIT STRING |
| four-four-TypeI-SinglePanel-Restriction-3 (e.g. CBSR_3_2) (SIZE (256)), | BIT STRING |
| eight-two-TypeI-SinglePanel-Restriction-3 (e.g. CBSR_3_2) (SIZE (256)), | BIT STRING |
| sixteen-one-TypeI-SinglePanel-Restriction-3 (e.g. CBSR_3_2) (SIZE (64)) | BIT STRING |
| }, | |
| typeI-SinglePanel-codebookSubsetRestriction-i2-3 (e.g. CBSR-i2_3_1) (SIZE (16)) | BIT STRING |
| typeI-SinglePanel-codebookSubsetRestriction-i2-3 (e.g. CBSR-i2_3_2) (SIZE (16))        OPTIONAL        -- Need R | BIT STRING |
| } | |
| }, | |

In the above example CBSR restrictions, the CBSRs restrictions (e.g. CBSR_3_1 and CBSR_3_2) and/or the CBSRs restrictions (e.g. CBSR-i2_3_1 and CBSR-i2_3_2) may represent the third CBSR (e.g. CBSR_3) for CSI C (for example, for NCJT hypothesis). For example, CBSR restrictions (e.g. CBSR_3_1) may correspond to pre-coders restricted for reporting of the third PMI and/or reporting of the third RI. For another example, CBSR restrictions (e.g. CBSR_3_2) may correspond to pre-coders restricted for reporting of the fourth PMI and/or reporting of the fourth RI. For example, CBSR restrictions (e.g. CBSR-i2_3_1) may correspond to pre-coders restricted for calculation of CQI in CSI C. For another example, CBSR restrictions (e.g. CBSR-i2_3_2) may correspond to pre-coders restricted for calculation of CQI in CSI C. For example, CBSR restrictions (e.g. CBSR_3_1 and/or CBSR-i2_3_1) defines P1, and CBSR restrictions (e.g. CBSR_3_2 and/or CBSR-i2_3_2) defines P2.

In the following, another Example CBSR restrictions are given for illustrative purposes.

Example CBSR Restrictions

| | |
|---|---|
| nrOfAntennaPorts        CHOICE { | |
| two                SEQUENCE { | |
| twoTX-CodebookSubsetRestriction-3 (e.g. CBSR_3) (SIZE (12)) | BIT STRING |
| } | |
| moreThanTwo            SEQUENCE | |
| n1-n2                CHOICE { | |
| two-one-TypeI-SinglePanel-Restriction-3 (e.g. CBSR_3) (SIZE (16)), | BIT STRING |
| two-two-TypeI-SinglePanel-Restriction-3 (e.g. CBSR_3) (SIZE (128)), | BIT STRING |
| four-one-TypeI-SinglePanel-Restriction-3 (e.g. CBSR_3) (SIZE (32)), | BIT STRING |
| three-two-TypeI-SinglePanel-Restriction-3 (e.g. CBSR_3) (SIZE (192)), | BIT STRING |
| six-one-TypeI-SinglePanel-Restriction-3 (e.g. CBSR_3) (SIZE (48)), | BIT STRING |
| four-two-TypeI-SinglePanel-Restriction-3 (e.g. CBSR_3) (SIZE (256)), | BIT STRING |

-continued

| | |
|---|---|
| eight-one-TypeI-SinglePanel-Restriction-3 (e.g. CBSR_3) (SIZE (64)), | BIT STRING |
| four-three-TypeI-SinglePanel-Restriction-3 (e.g. CBSR_3) (SIZE (384)), | BIT STRING |
| six-two-TypeI-SinglePanel-Restriction-3 (e.g. CBSR_3) (SIZE (384)), | BIT STRING |
| twelve-one-TypeI-SinglePanel-Restriction-3 (e.g. CBSR_3) (SIZE (96)), | BIT STRING |
| four-four-TypeI-SinglePanel-Restriction-3 (e.g. CBSR_3) (SIZE (512)), | BIT STRING |
| eight-two-TypeI-SinglePanel-Restriction-3 (e.g. CBSR_3) (SIZE (512)), | BIT STRING |
| sixteen-one-TypeI-SinglePanel-Restriction-3 (e.g. CBSR_3) (SIZE (128)) }, | BIT STRING |
| typeI-SinglePanel-codebookSubsetRestriction-i2-3 (e.g. CBSR-i2_3) (SIZE (32)) OPTIONAL        -- Need R } | BIT STRING |

In the above example CBSR restrictions, the CBSRs restrictions (e.g. CBSR 0.3 and/or CBSR-i2_3) may represent the third CBSR for CSI C (for example, for NCJT hypothesis). For example, the first half bits in CBSR_3 may be applied to P1, which is related to restriction of pre-coders for reporting of the third PMI and/or reporting of the third RI reporting and/or CQI calculation in CSI C, and the remaining half bits in CBSR_3 may be applied to P2, which is related to restriction of pre-coders for reporting of the fourth PMI and/or reporting of the fourth RI reporting and/or CQI calculation in CSI C. For example, the first half bits in CBSR-i2_3 (e.g. first 16 bits) may be applied to P1, which is related to restriction of pre-coders for CQI calculation in CSI C, and the remaining half bits in CBSR-i2_3 e.g. remaining 16 bits) may be applied to P2, which is related to restriction of pre-coders for CQI calculation in CSI C.

Alternatively or additionally, as illustrated in FIG. 11, the CS reporting setting may include the fourth CBSR and the fifth CBSR and/or the fourth RI restriction and the fifth RI restriction (e.g. (CBSR_4, CBSR_5) and/or (RI_res4, RI_res5)). Particularly, the CSI report setting may include the fourth and the fifth RI restrictions RI-Res4. RI-Res5 as well as the fourth and fifth CBSRs CBSR_4, CBSR_5. For example, which are all related to CSI C for the multi-TRP transmission.

In some embodiments, the two CBSRs CBSR_4. CBSR_5 and/or the two RI restrictions RI_res4, RI_res5 can be used for the third and fourth PMIs (PMI_3 and PMI_4) calculation/reporting and/or the third and fourth RIs RI_3, RI_4 calculation/reporting (or CSI measurement/reporting) and/or the calculation of CQI in CSI C related to some CSI-RS resources, for example, represented as CSI-RS resource W and CSI-RS resource V. For example, the CRI-RS resource W may include at least one of the CSI-RS resources in subset A. For another example, the CRI-RS resource V may include at least one of the CSI-RS resources associated with the CRI-RS resource W in subset B. Or alternatively, the CRI-RS resources W and V may include two CSI-RS resources with same two TC states (e.g. for NCJT hypothesis).

In some embodiments, the fourth CBSR CBSR_4 may correspond to pre-coders which are not allowed for reporting of the third PMI in CSI C. In some embodiments, the fifth CBSR CBSR_5 may correspond to pre-coders which are not allowed for reporting of the fourth PMI in CSI C. In some embodiments, the fourth CBSR CBSR_4 and/or the fifth CBSR CBSR_5 may correspond to pre-coders which are not allowed to be selected for calculation of CQI in CSI C. In some embodiments, the fourth RI restriction RI_res4 may define a fifth number of layers, and pre-coder(s) associated with the fifth number of layers are not allowed for reporting of the third PMI and/or reporting of the third RI in CSI C. In some embodiments, the fifth RI restriction RI_res5 may define a sixth number of layers, and pre-coder(s) associated with the sixth number of layers are not allowed for reporting of the fourth PMI and/or reporting of the fourth RI in CSI C. In some embodiments, the fourth RI restriction RI_res4 may define a fifth number of layers, and the fifth number of layers are not allowed for reporting of the third RI in CSI C. In some embodiments, the fifth RI restriction RI_res5 may define a sixth number of layers, and the sixth number of layers are not allowed for reporting of the fourth RI in CSI C.

In some embodiments of the present disclosure, the restriction CBSR_4 may define pre-coder(s) related to PMI_3 which are not allowed for CQI calculation, and the restriction CBSR_5 may define pre-coder(s) related to PMI_4 which not allowed for CQI calculation.

In some embodiments of the present disclosure, the restriction RI_res4 may define RI(s) which are not allowed for PMI_3 and/or R1_3 reporting, and the restriction RI_res5 may define RI(s) which are not allowed for PMI_4 and/or RI_4 reporting. Thus, reporting of the third PMI may be restricted based on at least one of the fourth CBSR and the fourth RI restriction, and reporting of the fourth PMI may be restricted based on at least, one of the fifth CBSR and the fifth RI restriction. Additionally, or alternatively, reporting of the third RI may be restricted based on at least one of the fourth CBSR and the fourth RI restriction, and reporting the fourth RI may be restricted based on at least one of the fifth CBSR and the fifth RI restriction The example restrictions are given as follows only for illustration purposes.

Example RI Restrictions ri-Restriction-4 (e.g. RI_res4) BIT STRING (SIZE (4))
ri-Restriction-5 (e.g. RI_res5) BIT STRING (SIZE (4))

Example CBSR Restrictions                                          5

```
nrOfAntennaPorts                                  CHOICE {
    two                                                SEQUENCE {
    twoTX-CodebookSubsetRestriction-4 (e.g. CBSR_4)             BIT STRING
(SIZE (6))
    twoTX-CodebookSubsetRestriction-5  (e.g. CBSR_5)            BIT STRING
(SIZE (6))
    },
    moreThanTwo                                       SEQUENCE
    n1-n2                                              CHOICE {
        two-one-TypeI-SinglePanel-Restriction-4 (e.g. CBSR_4)       BIT STRING
(SIZE (8)),
        two-two-TypeI-SinglePanel-Restriction-4 (e.g. CBSR_4)       BIT STRING
(SIZE (64)),
        four-one-TypeI-SinglePanel-Restriction-4 (e.g. CBSR_4)      BIT STRING
(SIZE (16)),
        three-two-TypeI-SinglePanel-Restriction-4 (e.g. CBSR_4)     BIT STRING
(SIZE (96)),
        six-one-TypeI-SinglePanel-Restriction-4 (e.g. CBSR_4)       BIT STRING
(SIZE (24)),
        four-two-TypeI-SinglePanel-Restriction-4 (e.g. CBSR_4)      BIT STRING
(SIZE (128)),
        eight-one-TypeI-SinglePanel-Restriction-4 (e.g. CBSR_4)     BIT STRING
(SIZE (32)),
        four-three-TypeI-SinglePanel-Restriction-4 (e.g. CBSR_4)    BIT STRING
(SIZE (192)),
        six-two-TypeI-SinglePanel-Restriction-4 (e.g. CBSR_4)       BIT STRING
(SIZE (192)),
        twelve-one-TypeI-SinglePanel-Restriction-4 (e.g. CBSR_4)    BIT STRING
(SIZE (48)),
        four-four-TypeI-SinglePanel-Restriction-4 (e.g. CBSR_4)     BIT STRING
(SIZE (256)),
        eight-two-TypeI-SinglePanel-Restriction-4 (e.g. CBSR_4)     BIT STRING
(SIZE (256)),
        sixteen-one-TypeI-SinglePanel-Restriction-4 (e.g. CBSR_4)   BIT STRING
(SIZE (64))
        two-one-TypeI-SinglePanel-Restriction-5 (e.g. CBSR_5)       BIT STRING
(SIZE (8)),
        two-two-TypeI-SinglePanel-Restriction-5 (e.g. CBSR_5)       BIT STRING
(SIZE (64)),
        four-one-TypeI-SinglePanel-Restriction-5 (e.g. CBSR_5)      BIT STRING
(SIZE (16)),
        three-two-TypeI-SinglePanel-Restriction-5 (e.g. CBSR_5)     BIT STRING
(SIZE (96)),
        six-one-TypeI-SinglePanel-Restriction-5 (e.g. CBSR_5)       BIT STRING
(SIZE (24)),
        four-two-TypeI-SinglePanel-Restriction-5 (e.g. CBSR_5)      BIT STRING
(SIZE (128)),
        eight-one-TypeI-SinglePanel-Restriction-5 (e.g. CBSR_5)     BIT STRING
(SIZE (32)),
        four-one-TypeI-SinglePanel-Restriction-5 (e.g. CBSR_5)      BIT STRING
(SIZE (192)),
        six-two-TypeI-SinglePanel-Restriction-5 (e.g. CBSR_5)       BIT STRING
(SIZE (192)),
        twelve-one-TypeI-SinglePanel-Restriction-5 (e.g. CBSR_5)    BIT STRING
(SIZE (48)),
        four-four-TypeI-SinglePanel-Restriction-5 (e.g. CBSR_5)     BIT STRING
(SIZE (256)),
        eight-two-TypeI-SinglePanel-Restriction-5 (e.g. CBSR_5)     BIT STRING
(SIZE (256)),
        sixteen-one-TypeI-SinglePanel-Restriction-5 (e.g. CBSR_5)   BIT STRING
(SIZE (64))
                                                       },
    typeI-SinglePanel-codebookSubsetRestriction-i2-4 (e.g. CBSR-i2_4)     BIT
STRING (SIZE (16))
    typeI-SinglePanel-codebookSubsetRestriction-i2-5 (e.g. CBSR-i2_5)     BIT
STRING (SIZE (16))
        OPTIONAL          -- Need R
```

In the example restrictions, RI_res4 and RI_res5 are two separate restrictions, and CBSR_4 and CBSR_5 are two separate restrictions, and CBSR-i2_4 and CBSR-i2_5 arm two separate restrictions. Thus, each of these restrictions can be used to restrict the CSI resources separately. For example, the RI_res4 can be used to define RI(s) not allowed for 2.5

CSI reporting for CSI A (e.g. concerning TRP1), the RI_res5 can be used to define RI(s) not allowed for CSI reporting for CSI B (e.g. concerning TRP2).

Differently, in the example third CBSR restriction, it uses one restriction to define a pair of CSL resources and thus it is possible to restrict a specific pair of CSI resources among all possible resource combination. For example, the RI pair (RI, R2) can be defined to be excluded from resources for CSI reporting, but other resource pair including RI or R2 can still be applied.

In some embodiments of the present disclosure, the first CSI includes a first CQI, and randomly selected precoder for calculation of a first channel quality indicator (CQI) in the first CSI may be restricted based on the first CBSR (e.g. CBSR-i2_1. Additionally or alternatively, the second CSI includes a second CQI, and randomly selected precoder for calculation of a second CQI in the second CSI may be restricted based on the second CBSR (e.g. CBSR-i2_2). Additionally or alternatively, the third CSI includes a third CQI, and randomly selected precoder for calculation of a third CQI in the third CSI may be restricted based on the third CBSR (e.g. CBSR-i2_3 or CBSR-i2_3_1 and CBSR-i2_3_2). Additionally or alternatively, the third CSI includes a third CQI and randomly selected precoder for calculation of a third CQI in the third CSI may be restricted based on the fourth CBSR (e.g. CBSR-i2_4) and the filth CBSR (e.g. CBSR-i22_5).

It shall be notice that although in the above example embodiments, the CSI report setting include at least two R) restrictions and/or at least two CBSR restrictions, but the present disclosure is not limited thereto. For example, it is possible to include only the third CSI resource restriction (CBSR_3. RI_Res3) or the fourth and fifth resource restriction ((CBSR)) for the multi-TRP transmission.

In addition, it shall be noted that the CSI reporting setting solutions described hereinabove with reference to FIG. 11 can be applied in combination with the CSR report solutions described with reference to FIGS. 1 to 10, or alternatively, they can be applied separately as a separate aspect of the present disclosure.

Figure 12:
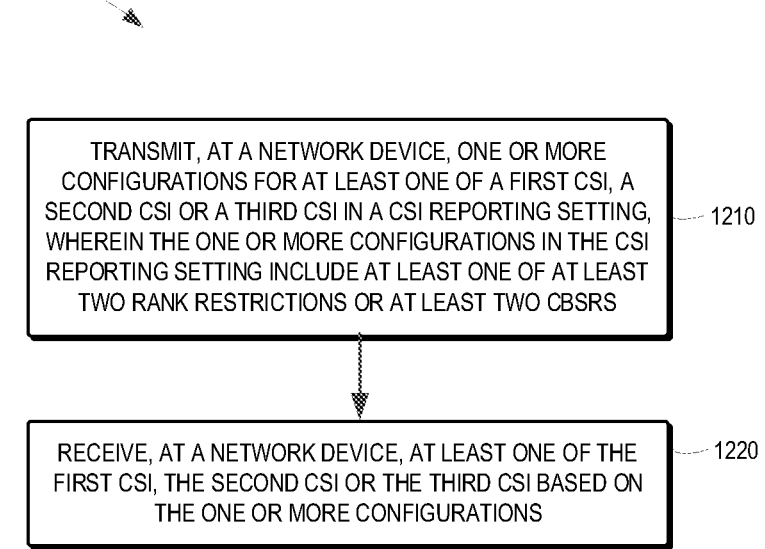
FIG. 12 illustrates a flowchart of another communication method according to an embodiment of the present disclosure.

FIG. 12 illustrates a flowchart of an example method 1200 for communication according to embodiments of the present application. The communication method 1200 could be performed at a network device including fore example TRP 110 or 120 as illustrated in FIG. 1.

As shown in FIG. 12, in block 1210, the network device transmits, at a network device, one or more configurations for at least one of a first Channel State Information (CSI), a second CSI or a third CSI in a CSI reporting setting. The one or more configurations in the CS reporting setting include at least one of at least two rank restrictions or at least two codebook subset restrictions (CBSRs). In block 1210, the network device receives, at a network device, at least one of the first CSI, the second CSI or the third CSI based on the one or more configurations.

In some embodiments of the present application, the at least two rank restrictions comprise at least two of a first rank indicator (RI) restriction, a second RI restriction, a third RI restriction, a fourth RI restriction or a fifth RI restriction, and/or wherein the at least two CBSRs comprise at least two of a first CBSR, a second CBSR, a third CBSR, a fourth CBSR or a fifth CBSR. For example, the first RI restriction and/or the first CBSR are related to the first CSI. Additionally or alternatively, the second RI restriction and/or the second CBSR are related to the second CSI, and/or. Additionally or alternatively, the third RI restriction and/or the third CBSR are related to the third CSI. Additionally or alternatively, the fourth and fifth RI restrictions and/or the fourth and fifth CBSRs am related to the third CSI.

In some embodiments of the present application, the first CSI comprises at least one of a first CRI, a first PMI and a first RI. Additionally or alternatively, the second CSI comprises at least one of a second CRI, a second PMI and a second RI. Additionally or alternatively, the third CSI comprises at least one of one or both of a third CRI and a fourth CRI, a third PMI and a fourth PMI, and a third RI and a fourth RI.

In some embodiments of the present application, the first CSI is related to a single Transmission/Reception Point (TRP) transmission. Additionally or alternatively, the second CSI is related to the single TRP transmission. Additionally or alternatively, the third CSI is related to a multi-TRP transmission.

In some embodiments of the present disclosure, reporting of at least one of the first PMI and the first RI is restricted based on at least one of the first CBSR and the first RI restriction. Additionally or alternatively, reporting of at least one of the second PMI and the second RI is restricted based on at least one of the second CBSR and the second RI restriction. Additionally or alternatively, reporting of the third and fourth PMIs is restricted based on at least one of the third CBSR and the third RI restriction; and reporting of the third and fourth RIs is restricted based on at least one of the third CBSR and the third RI restriction. Additionally or alternatively, reporting of the third PMI is restricted based on at least one of the fourth CBSR and the fourth RI restriction, and reporting of the fourth PMI is restricted based on at least one of the fifth CBSR and the fifth RI restriction. Additionally or alternatively, reporting of the third RI is restricted based on at least one of the fourth CBSR and the fourth RI restriction, and reporting of the fourth RI is restricted based on at least one of the fifth CBSR and the fifth RI restriction. Additionally or alternatively, randomly selected precoder for calculation of a first channel quality indicator (CQI) in the first CSI is restricted based on the first CBSR. Additionally or alternatively, randomly selected precoder for calculation of a second CQI in the second CSI is restricted based on the second CBSR. Additionally or alternatively, r randomly selected precoder for calculation of a third CQI in the third CSI is restricted based on the third CBSR. Additionally or alternatively, randomly selected precoder for calculation of a third CQI in the third CSI is restricted based on the fourth CBSR and the fifth CBSR.

In some embodiments of the present application, the method further comprises transmitting, at the network device, a Channel State Information Reference Signal (CSI-RS) resource set for channel measurement, wherein the CSI-RS resource set includes at least two CSI-RS resources.

In some embodiments of the present application, the CSI-RS resource set comprises a first subset and a second subset.

In some embodiments of the present application, each of the CSI-RS resource in the CSI-RS resource set is associated with one Transmission Configuration indication (TCI) state.

In some embodiments of the present application, the first subset includes at least one CSI-RS resource each associated with a CSI-RS resource in the second subset.

In some embodiments of the present application, the at least one CSI-RS resource the first subset and the associated CSI-RS resource in the second subset are used for a multi-TRP transmission.

In some embodiments of the present application, each of the CSI-RS resources in the first subset is associated with two TCI states and wherein each of the CSI-RS resource in the second subset is associated with one TCI state.

In some embodiments of the present application, the first subset comprises at least one pair of CSI-RS resources associated with same Iwo TC states.

In some embodiments of the present application, the at least one pair of CSI-RS resources associated with same two TCI states an used for a multi-TRP transmission.

According to embodiments of the present disclosure, a terminal device comprises circuitry configured to: receive, at a terminal device, one or more configurations for at least one of a first Channel State Information (CSI), a second CSI or a third CSI in a CSI reporting setting, wherein the one or more configurations in the CSI reporting setting include at least one of at least two rank restrictions or at least two codebook subset restrictions (CBSRs); and transmit, to a network device, at least one of the first CSI, the second CSI or the third CSI based on the one or more configurations.

In some embodiments of the present disclosure, the at least two rank restrictions may comprise at least two of a first rank indicator (RI) restriction, a second RI restriction, a third RI restriction, a fourth RI restriction or a fifth RI restriction, and/or wherein the at least two CBSRs comprise at least two of a first CBSR, a second CBSR, a third CBSR, a fourth CBSR or a fifth CBSR. Additionally or alternatively, the first RI restriction and/or the first CBSR are, related to the first CSI. Additionally or alternatively, the second RI restriction and/or the second CBSR are related to the second CSI, and/or. Additionally or alternatively, the third RI restriction and/or the third CBSR are related to the third CSI. Additionally or alternatively, the fourth and fifth RI restrictions and/or the fourth and fifth CBSRs are related to the third CSI.

In some embodiments of the present disclosure, the first CSI comprises at least one of a first CRI, a first PMI and a first R. Additionally or alternatively, the second CSI comprises at least one of a second CRI, a second PMI and a second RI. Additionally or alternatively, the third CSI comprises at least one of one or both of a third CRI and a fourth CRI, a third PMI and a fourth PMI, and a third RI and a fourth RI.

In some embodiments of the present disclosure, the first CSI is related to a single Transmission/Reception Point (TRP) transmission. Additionally or alternatively, the second CSI is related to the single TRP transmission. Additionally or alternatively, the third CSI is related to a multi-TRP transmission.

In some embodiments of the present disclosure, reporting of at least one of the first PMI and the first RI is restricted based on at least one of the first CBSR and the first RI restriction. Additionally or alternatively, reporting of at least one of the second PMI and the second RI is restricted based on at least one of the second CBSR and the second RI restriction. Additionally or alternatively, reporting of the third and fourth PMIs is restricted based on at least one of the third CBSR and the third RI restriction; and reporting of the third and fourth RIs is restricted based on at least one of the third CBSR and the third RI restriction. Additionally or alternatively, reporting of the third PMI is restricted based on at least one of the fourth CBSR and the fourth RI restriction, and reporting of the fourth PMI is restricted based on at least one of the fifth CBSR and the fifth RI restriction. Additionally or alternatively, reporting of the third RI is restricted based on at least one of the fourth CBSR and the fourth RI restriction, and exporting of the fourth RI is restricted based on at least one of the fifth CBSR and the fifth RI restriction. Additionally or alternatively, randomly selected precoder for calculation of a first channel quality indicator (CQI) in the first CSI is restricted based on the first CBSR. Additionally or alternatively, randomly selected precoder for calculation of a second CQI in the second CSI is restricted based on the second CBSR. Additionally or alternatively, r randomly selected precoder for calculation of a third CQI in the third CSI is restricted based on the third CBSR. Additionally or alternatively, randomly selected precoder for calculation of a third CQI in the third CSI is restricted based on the fourth CBSR and the fifth CBSR.

In some embodiments of the present disclosure, the circuitry may be further configured to receive, at the terminal device, a Channel State Information Reference Signal (CSI-RS) resource set for channel measurement, wherein the CSI-RS resource set includes at least two CSI-RS resources for CSI reporting.

In some embodiments of the present disclosure, the CSI-RS resource set comprises a first subset and a second subset.

In some embodiments of the present disclosure, each of the CSI-RS resource in the CSI-RS resource set is associated with one Transmission Configuration Indication (TCI) state.

In some embodiments of the present disclosure, the first subset includes at least one CSI-RS resource each associated with a CSI-RS resource in the second subset.

In some embodiments of the present disclosure, the at least one CSI-RS resource the first subset and the associated CSI-RS resource in the second subset are used for a multi-TRP transmission.

In some embodiments of the present disclosure, each of the CSI-RS resources in the first subset is associated with two TCI states and wherein each of the CSI-RS resource in the second subset is associated with one TC state.

In some embodiments of the present disclosure, the first subset comprises at least one pair of CSI-RS resources associated with same two TCI states.

In some embodiments of the present, disclosure, at least one pair of CSI-RS resources associated with same two TCI states are used for a multi-TRP transmission.

According to embodiments of the present disclosure, a network device comprises circuitry configured to transmit, at a network device, one or more configurations for at least one of a first Channel State Information (CSI), a second CSI or a third CSI in a CSI reporting setting, wherein the one or more configurations in the CSI reporting setting include at least one of at least two rank restrictions or at least two codebook subset restrictions (CBSRs); and receive, at a network device, at least one of the first CSI, the second CSI or the third CSI based on the one or more configurations.

In some embodiments of the present disclosure, the at least two rank restrictions comprise at least two of a first rank indicator (RI) restriction, a second RI restriction, a third RI restriction, at fourth RI restriction or a fifth RI restriction. Additionally, or alternatively, the at least two CBSRs comprise at least two of a first CBSR, a second CBSR, a third CBSR, a fourth CBSR or a fifth CBSR. Additionally, or alternatively, the first RI restriction and/or the first CBSR are related to the first CSI. Additionally, or alternatively, the second RI restriction and/or the second CBSR are related to the second CSI. Additionally, or alternatively, the third RI restriction and/or the third CBSR are related to the third CSI. Additionally, or alternatively, the fourth and fifth RI restrictions and/or the fourth and fifth CBSRs are related to the third CSI.

In some embodiments of the present disclosure, the first CSI comprises at least one of a first CRI, a first PMI and a first RI. Additionally or alternatively, the second CSI comprises at least one of a second CRI, a second PMI and a second RI. Additionally or alternatively, the third CSI comprises at least one of one or both of a third CRI and a fourth CRI, a third PMI and a fourth PMI, and a third RI and a fourth RI.

In some embodiments of the present disclosure, the first CSI is related to a single Transmission/Reception Point (TRP) transmission. Additionally or alternatively, the second CSI is related to the single TRP transmission. Additionally or alternatively, the third CSI is related to a multi-TRP transmission.

In some embodiments of the present disclosure, reporting of at least one of the first PMI and the first RI is restricted based on at least one of the first CBSR and the first RI restriction. Additionally or alternatively, reporting of at least one of the second PMI and the second RI is restricted based on at least one of the second CBSR and the second RI restriction. Additionally or alternatively, reporting of the third and fourth PMIs is restricted based on at least one of the third CBSR and the third RI restriction; and reporting of the third and fourth RIs is restricted based on at least one of the third CBSR and the third RI restriction. Additionally or alternatively, reporting of the third PMI is restricted based on at least one of the fourth CBSR and the fourth RI restriction, and reporting of the fourth PMI is restricted based on at least one of the fifth CBSR and the fifth RI restriction. Additionally or alternatively, reporting of the third RI is restricted based on at least one of the fourth CBSR and the fourth RI restriction, and reporting of the fourth RI is restricted based on at least one of the fifth CBSR and the fifth RI restriction. Additionally or alternatively, randomly selected precoder for calculation of a first channel quality indicator (CQI) in the first CSI is restricted based on the first CBSR. Additionally or alternatively, randomly selected precoder for calculation of a second CQI in the second CSI is restricted based on the second CBSR. Additionally or alternatively, r randomly selected precoder for calculation of a third CQI in the third CSI is restricted based on the third CBSR. Additionally or alternatively, randomly selected precoder for calculation of a third CQI in the third CSI is restricted based on the fourth CBSR and the fifth CBSR.

In some embodiments of the present disclosure, the circuitry may be further configured to transmit, at the network device, a Channel State Information Reference Signal (CSI-RS) resource set for channel measurement, wherein the CSI-RS resource set includes at least two CSI-RS resources.

In some embodiments of the present disclosure, the CSI-RS resource set comprises a first subset and a second subset.

In some embodiments of the present disclosure, each of the CSI-RS resource in the CSI-RS resource set is associated with one Transmission Configuration Indication (TCI) state.

In some embodiments of the present disclosure, the first subset includes at least one CSI-RS resource each associated with a CSI-RS resource in the second subset.

In some embodiments of the present disclosure, the at least one CSI-RS resource the first subset and the associated CSI-RS resource in the second subset are used for a multi-TRP transmission.

In some embodiments of the present disclosure, each of the CSI-RS resources in the first, subset is associated with two TCI states and wherein each of the CSI-RS resource in the second subset is associated with one TCI state.

In some embodiments of the present disclosure, the first subset comprises at least one pair of CSI-RS resources associated with same two TCI states.

In some embodiments of the present disclosure, the at least one pair of CSI-RS resources associated with same two TCI states are used for a multi-TRP transmission.

Figure 13:
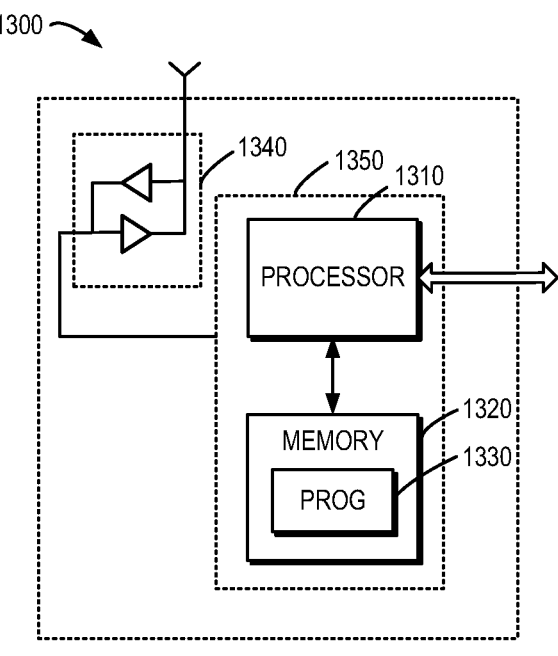
FIG. 13 schematically illustrates a simplified block diagram of a communication device 1300 that can implement the CSI reporting according to embodiments of the present disclosure.

FIG. 13 is a simplified block diagram of a device 1300 that is suitable for implementing some embodiments of the present disclosure. The device 1300 can be considered as a further embodiment of the network device including TRP 110, 120, or the terminal device 130, as shown in FIG. 1. Accordingly, the device 2200 can be implemented at or as at least a part of the network device including TRP 110, 120, or the terminal device 130.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1320 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network, elements, such as X2 or Xn interface for bidirectional communications between gNBs or eNBs. S1 interface for communication between a Mobility Management Entity (MME)/Serving Gateway (S-GW) and the gNB or eNB. Un interface for communication between the gNB or eNB and a relay node (RN), or Un interface for communication between the gNB or eNB and a terminal device.

The program 1330 is assumed to include program instructions that, when executed by the associated processor 1310, enable the device 1300 to operate in accordance with the embodiments of the present disclosure, as discussed herein with reference to any of FIGS. 1 to 12. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs). System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of the figures. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device, in a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, performed by a terminal device, the method comprising:

receiving a configuration comprising a first Rank Indicator (RI) restriction and a second RI restriction, wherein the first RI restriction indicates a restriction for RI for one or more resource pairs in a channel state information reference signal (CSI-RS) resource set, wherein a first CSI-RS resource indicator (CRI) corresponds to a resource pair among the one or more resource pairs, wherein a bit size of the second RI restriction is 8, and wherein the second RI restriction indicates a restriction for RI, which is applied to a third RI associated with one CSI-RS resource in the CSI-RS resource set; and transmitting a channel state information (CSI) report based on the configuration.

2. The method of claim 1, wherein the CSI report comprises the first CRI.

3. The method of claim 2, wherein a bit size for the first CRI is ceil(log 2(M)), and M is a number of CSI-RS resource pairs in the CSI-RS resource set.

4. The method of claim 2, wherein:

the CSI report further comprises one CRI or two CRIs;

a bit size for the one CRI is ceil(log 2(N)), in a case where one CRI is further included in the CSI report;

a bit size for one of the two CRIs is ceil(log 2(N1)) and a bit size of the other of the two CRIs is ceil(log 2(N–N1)), in a case where two CRIs are further included in the CSI report; and N1 is a number of CSI-RS resources in a first subset of the CSI-RS resource set, N–N1 is a number of CSI-RS resources in a second subset of the CSI-RS resource set, and Nis a number of CSI-RS resources in the CSI-RS resource set.

5. The method of claim 1, wherein the CSI report comprises a first RI and a second RI, and wherein the first RI and the second RI correspond to the resource pair among the one or more resource pairs in the CSI-RS resource set.

6. The method of claim 5, wherein the first RI and the second RI are allowed according to the first RI restriction.

7. The method of claim 1, wherein the first RI restriction comprises a RI pair where a precoding matrix indicator (PMI) and RI reporting for the CSI report are not allowed to correspond to the RI pair.

8. A method, performed by a network device, the method comprising:

transmitting a configuration comprising a first Rank Indicator (RI) restriction and a second RI restriction, wherein the first RI restriction indicates a restriction for RI for one or more resource pairs in a channel state information reference signal (CSI-RS) resource set, wherein a first CSI-RS resource indicator (CRI) corresponds to a resource pair among the one or more resource pairs, wherein a bit size of the second RI restriction is 8, and wherein the second RI restriction indicates a restriction for RI, which is applied to a third RI associated with one CSI-RS resource in the CSI-RS resource set; and receiving a channel state information (CSI) report based on the configuration.

9. The method of claim 8, wherein the CSI report comprises the first CRI.

10. The method of claim 9, wherein a bit size for the first CRI is ceil(log 2(M)), and wherein M is a number of CSI-RS resource pairs in the CSI-RS resource set.

11. The method of claim 9, wherein, wherein:

the CSI report further comprises one CRI or two CRIs;

a bit size for the one CRI is ceil(log 2(N)), in a case where one CRI is further included in the CSI report;

a bit size for one of the two CRIs is ceil(log 2(N1)) and a bit size of the other of the two CRIs is ceil(log 2(N–N1)), in a case where two CRIs are further included in the CSI report; and N1 is a number of CSI-RS resources in a first subset of the CSI-RS resource set, N–N1 is a number of CSI-RS resources in a second subset of the CSI-RS resource set, and Nis a number of CSI-RS resources in the CSI-RS resource set.

12. The method of claim 8, wherein the CSI report comprises a first RI and a second RI, and wherein the first RI and the second RI correspond to the resource pair among the one or more resource pairs in the CSI-RS resource set.

13. The method of claim 12, wherein the first RI and the second RI are allowed according to the first RI restriction.

14. The method of claim 8, wherein the first RI restriction comprises a RI pair where a precoding matrix indicator (PMI) and RI reporting for the CSI report are not allowed to correspond to the RI pair.

15. A terminal device, comprising a processor configured to cause the terminal device to:

receive a configuration comprising a first Rank Indicator (RI) restriction and a second RI restriction, wherein the first RI restriction indicates a restriction for RI for one or more resource pairs in a channel state information reference signal (CSI-RS) resource set, wherein a first CSI-RS resource indicator (CRI) corresponds to a resource pair among the one or more resource pairs, wherein a bit size of the second RI restriction is 8, and wherein the second RI restriction indicates a restriction for RI, which is applied to a third RI associated with one CSI-RS resource in the CSI-RS resource set; and transmit a channel state information (CSI) report based on the configuration.

16. The terminal device of claim 15, wherein the CSI report comprises the first CRI.

17. The terminal device of claim 16, wherein:

the CSI report further comprises one CRI or two CRIs;

a bit size for the one CRI is ceil(log 2(N)), in a case where one CRI is further included in the CSI report;

a bit size for one of the two CRIs is ceil(log 2(N1)) and a bit size of the other of the two CRIs is ceil(log 2(N–N1)), in a case where two CRIs are further included in the CSI report; and N1 is a number of CSI-RS resources in a first subset of the CSI-RS resource set, N–N1 is a number of CSI-RS resources in a second subset of the CSI-RS resource set, and Nis a number of CSI-RS resources in the CSI-RS resource set.

18. The terminal device of claim 15, wherein the CSI report comprises a first RI and a second RI, and wherein the first RI and the second RI correspond to the resource pair among the one or more resource pairs in the CSI-RS resource set.

19. A network device comprising a processor configured to cause the network device to:

transmit a configuration comprising a first Rank Indicator (RI) restriction and a second RI restriction, wherein, the first RI restriction indicates a restriction for RI for one or more resource pairs in a channel state information reference signal (CSI-RS) resource set, wherein a first CSI-RS resource indicator (CRI) corresponds to a resource pair among the one or more resource pairs, wherein a bit size of the second RI restriction is 8, and wherein the second RI restriction indicates a restriction for RI, which is applied to a third RI associated with one CSI-RS resource in the CSI-RS resource set; and receive a channel state information (CSI) report based on the configuration.

20. The network device of claim 19, wherein the CSI report comprises the first CRI.

21. The network device of claim 20, wherein:

the CSI report further comprises one CRI or two CRIs;

a bit size for the one CRI is ceil(log 2(N)), in a case where one CRI is further included in the CSI report;

a bit size for one of the two CRIs is ceil(log 2(N1)) and a bit size of the other of the two CRIs is ceil(log 2(N–N1)), in a case where two CRIs are further included in the CSI report; and N1 is a number of CSI-RS resources in a first subset of the CSI-RS resource set, N–N1 is a number of CSI-RS resources in a second subset of the CSI-RS resource set, and N is a number of CSI-RS resources in the CSI-RS resource set.

22. The network device of claim 19, wherein the CSI report comprises a first RI and a second RI, and wherein the first RI and the second RI correspond to the resource pair among the one or more resource pairs in the CSI-RS resource set.

* * * * *